(12) United States Patent
Sugiura et al.

(10) Patent No.: US 9,660,276 B2
(45) Date of Patent: May 23, 2017

(54) FUEL CELL INCLUDING SEPARATOR WITH OUTER ENDS PLACED INWARD OF FLUID PASSAGES FORMED IN FRAME

(75) Inventors: Seiji Sugiura, Tochigi-ken (JP); Tetsuya Nakamura, Tochigi-ken (JP)

(73) Assignee: Honda Motor Co., Ltd., Tokyo (JP)

(*) Notice: Subject to any disclaimer, the term of this patent is extended or adjusted under 35 U.S.C. 154(b) by 394 days.

(21) Appl. No.: 13/880,919

(22) PCT Filed: Sep. 5, 2011

(86) PCT No.: PCT/JP2011/070130
§ 371 (c)(1),
(2), (4) Date: Apr. 22, 2013

(87) PCT Pub. No.: WO2012/053288
PCT Pub. Date: Apr. 26, 2012

(65) Prior Publication Data
US 2013/0209909 A1 Aug. 15, 2013

(30) Foreign Application Priority Data

Oct. 20, 2010 (JP) .................. 2010-235425
Oct. 20, 2010 (JP) .................. 2010-235427
(Continued)

(51) Int. Cl.
*H01M 8/02* (2016.01)
*H01M 8/04* (2016.01)
(Continued)

(52) U.S. Cl.
CPC ..... *H01M 8/04007* (2013.01); *H01M 8/0273* (2013.01); *H01M 8/0278* (2013.01);
(Continued)

(58) Field of Classification Search
CPC ............ H01M 8/0278; H01M 8/0297; H01M 8/04089; H01M 8/0273; H01M 8/04007; H01M 8/04201
(Continued)

(56) References Cited

U.S. PATENT DOCUMENTS 7,695,845 B2 4/2010 Sugita et al.
2006/0110649 A1* 5/2006 Nishiyama et al. ............ 429/38
(Continued)

FOREIGN PATENT DOCUMENTS

| CN | 101335358 A | 12/2008 |
|---|---|---|
| JP | 8-222237 | 8/1996 |
| JP | 2009-9838 | 1/2009 |

OTHER PUBLICATIONS

Canadian Office Action for Application No. 2,815,344, 2 pages, dated Oct. 2, 2014.
(Continued)

*Primary Examiner* — Sean P Cullen
(74) *Attorney, Agent, or Firm* — Nelson Mullins Riley & Scarborough LLP; Anthony A. Laurentano

(57) ABSTRACT

A cell unit constituting a fuel cell is provided with a first electrolyte membrane/electrode structure, a first separator, a second electrolyte membrane/electrode structure, and a second separator. The first and second electrolyte membrane/electrode structures respectively have a frame section on the outer periphery, and the frame sections are formed with a fluid communicating hole extending in the stacking direction. The first and second separators are disposed towards the inside of the fluid communication hole and are respectively provided with two metal plates which have the same shape and which are stacked on one another.

17 Claims, 32 Drawing Sheets

(30) Foreign Application Priority Data

Oct. 20, 2010 (JP) ................................. 2010-235718
Oct. 20, 2010 (JP) ................................. 2010-235721
Dec. 16, 2010 (JP) ................................. 2010-279976

(51) Int. Cl.
    *H01M 8/24*     (2016.01)
    *H01M 8/04007*     (2016.01)
    *H01M 8/0276*     (2016.01)
    *H01M 8/0297*     (2016.01)
    *H01M 8/04089*     (2016.01)
    *H01M 8/04082*     (2016.01)
    *H01M 8/0273*     (2016.01)
    *H01M 8/0258*     (2016.01)

(52) U.S. Cl.
    CPC ..... *H01M 8/0297* (2013.01); *H01M 8/04089* (2013.01); *H01M 8/04201* (2013.01); *H01M 8/0258* (2013.01); *Y02E 60/50* (2013.01)

(58) Field of Classification Search
    USPC ....... 429/434, 457, 460, 463, 469, 508, 514, 429/518
    See application file for complete search history.

(56) References Cited

U.S. PATENT DOCUMENTS

2008/0134496 A1    6/2008    Bae
2009/0004539 A1    1/2009    Ishikawa et al.
2009/0291350 A1*  11/2009    Ishida et al. .................... 429/34

OTHER PUBLICATIONS

Chinese Office Action issued in Chinese Patent Application No. 201180050089.7 dated Oct. 13, 2014.
International Search Report for Application No. PCT/JP2011/070130, 2 pages, dated Oct. 4, 2011.

* cited by examiner

FUEL CELL INCLUDING SEPARATOR WITH OUTER ENDS PLACED INWARD OF FLUID PASSAGES FORMED IN FRAME

RELATED APPLICATIONS

This application is a 35 U.S.C. 371 national stage filing of International Application No. PCT/JP2011/070130, filed Sep. 5, 2011, which claims priority to Japanese Patent Application No. 2010-235425, filed on Oct. 20, 2010, Japanese Patent Application No. 2010-235427, filed on Oct. 20, 2010, Japanese Patent Application No. 2010-235718, filed on Oct. 20, 2010, Japanese Patent Application 2010-235721, filed on Oct. 20, 2010, and Japanese Patent Application No. 2010-279976, filed on Dec. 16, 2010 in Japan. The contents of the aforementioned applications are hereby incorporated by reference.

TECHNICAL FIELD

The present invention relates to a fuel cell including a cell unit formed by sandwiching an electrolyte electrode assembly between a first separator and a second separator. The electrolyte electrode assembly includes a pair of electrodes and an electrolyte interposed between the electrodes.

BACKGROUND ART

For example, a solid polymer electrolyte fuel cell employs a membrane electrode assembly (electrolyte electrode assembly) which includes an anode, a cathode, and a solid polymer electrolyte membrane interposed between the anode and the cathode. The electrolyte membrane is a solid polymer ion exchange membrane. Each of the anode and the cathode includes an electrode catalyst layer and a porous carbon layer. The membrane electrode assembly and separators (bipolar plates) sandwiching the membrane electrode assembly make up a unit cell. In use, generally, a predetermined number of unit cells are stacked together to form a fuel cell stack, which is mounted in a vehicle, for example.

In general, the fuel cell adopts the so-called internal manifold structure where supply passages and discharge passages extend through separators in a stacking direction. The fuel gas, the oxygen-containing gas, and the coolant are supplied from the respective supply passages respectively to a fuel gas flow field, an oxygen-containing gas flow field, and a coolant flow filed along electrode surfaces, and then, the fuel gas, the oxygen-containing gas, and the coolant are discharged into the respective discharge passages.

For example, in a fuel cell separator disclosed in Japanese Laid-Open Patent Publication No. 08-222237, as shown in FIG. 32, a separator plate 1 is provided. The separator plate 1 is a metal plate, and a large number of projections 2a, 2b are formed on front and back surfaces of the separator plate 1 by embossing or dimpling. Manifold loading ports 3a, 3b, 3c, and 3d for being loaded with respective gas manifolds, extend through the separator plate 1 outside an area having the projections 2a, 2b.

For example, the gas manifold loading ports 3a, 3b, 3c, and 3d are used as a fuel gas inlet manifold, an oxygen-containing gas inlet manifold, a fuel gas discharge manifold, and an oxygen-containing gas discharge manifold.

SUMMARY OF INVENTION

However, since the manifold loading ports 3a, 3b, 3c, and 3d extend through the separator plate 1, the area of the separator plate 1 is considerably large. As a consequence, in particular, a large amount of expensive material such as stainless steel is required for the separator plate 1, and the unit cost for the component is high undesirably.

The present invention has been made to solve the problems of this type, and an object of the present invention is to provide a fuel cell which makes it possible to reduce the size of relatively expensive separators, and achieve cost reduction.

The present invention relates to a fuel cell including a cell unit formed by sandwiching an electrolyte electrode assembly between a first separator and a second separator. The electrolyte electrode assembly includes a pair of electrodes and an electrolyte interposed between the electrodes.

In the fuel cell, a frame member made of polymer material is provided integrally with an outer circumference of the electrolyte electrode assembly, fluid passages including a reactant gas supply passage, a reactant gas discharge passage, a coolant supply passage, and a coolant discharge passage extend through the frame member in the stacking direction, and a seal member for hermetically surrounding the fluid passages and an outer circumference of a reaction surface is provided between the frame members that are adjacent to each other in the stacking direction.

At least the first separator or the second separator includes two plates having the same outer shape and which are joined together, and outer circumferential ends of the first separator and the second separator are positioned on an inward side relative to the fluid passages.

Further, in the present invention, outer circumferential ends of the first separator and the second separator are positioned on an inward side relative to the fluid passages, and the first separator and the second separator have a first reactant gas flow field and a second reactant gas flow field for allowing different reactant gases to flow along separator surfaces, respectively, on both sides of the electrolyte electrode assembly.

Further, connection channels are formed to connect the reactant gas supply passage and the reactant gas discharge passage to the first reactant gas flow field, and the connection channels include grooves formed in a surface of the frame member and extending along the separator surface.

Further, in the present invention, connection channels are formed to connect the reactant gas supply passage and the reactant gas discharge passage to the first reactant gas flow field. The connection channels include grooves formed in a surface of the frame member and extending along the separator surface and holes connected to the grooves and extending through the first separator or the second separator in the stacking direction.

Further, in the present invention, a frame member made of polymer material is provided integrally with an outer circumference of the electrolyte electrode assembly, and fluid passages including a reactant gas supply passage, a reactant gas discharge passage, a coolant supply passage, and a coolant discharge passage extend through the frame member in the stacking direction. Outer circumferential ends of the first separator and the second separator are positioned on an inward side relative to the fluid passages, and at least the first separator or the second separator includes two plates to form a coolant flow field inside the first separator or the second separator for allowing a coolant to flow along a separator surface.

A seal member for hermetically surrounding the fluid passages and an outer circumference of a reaction surface is provided between the frame members that are adjacent to each other in the stacking direction, and connection channels connecting the coolant supply passage and the coolant discharge passage to the coolant flow field are formed between the frame members that are adjacent to each other in the stacking direction.

In the present invention, the fluid passages extend in the stacking direction through the frame members provided around the electrolyte electrode assembly. Therefore, no fluid passages are required in the first separator and the second separator.

The outer dimensions of the first separator and the second separator can be determined in such a manner that the outer dimensions of the first separator and the second separator correspond to the power generation area. Thus, reduction in the size and weight of the first separator and the second separator can be achieved easily, and it becomes possible to reduce the production cost of the first separator and the second separator. Accordingly, the first separator and the second separator can be produced efficiently, and it is possible to obtain the entire fuel cell economically. Further, in each cell unit, the seal members can be provided only on one surface. In the structure, the size of the fuel cell in the stacking direction is reduced as a whole.

Further, at least the first separator or the second separator includes two plates having the same outer shape and which are stacked together. In the structure, the production cost of the separator is reduced effectively, and economically.

Further, in the present invention, a seal member for hermetically surrounding the fluid passages is provided between the frame members that are adjacent to each other in the stacking direction. Further, connection channels are formed in a surface of the frame member and a surface of the first separator to connect the reactant gas supply passage and the reactant gas discharge passage to the reactant gas flow field. Thus, the structure of the fuel cell is simplified, and it becomes possible to effectively reduce the size of the fuel cell in the stacking direction as a whole.

Further, in the present invention, a seal member for hermetically surrounding the fluid passages is provided between the frame members that are adjacent to each other in the stacking direction. Connection channels are formed to connect the reactant gas supply passage and the reactant gas discharge passage to the first reactant gas flow field. The connection channels include grooves formed in the frame member and extending along the separator surface, and holes connected to the grooves and extending through a first separator or a second separator in the stacking direction. Thus, the structure of the fuel cell is simplified, and it becomes possible to reduce the size of the fuel cell in the stacking direction as a whole.

Further, in the present invention, a seal member for hermetically surrounding the fluid passages is provided between the frame members that are adjacent to each other in the stacking direction, and connection channels connecting the coolant supply passage and the coolant discharge passage to the coolant flow field are formed between the frame members that are adjacent to each other in the stacking direction. Thus, the structure of the fuel cell is simplified, and it becomes possible to effectively reduce the size of the fuel cell in the stacking direction as a whole.

DESCRIPTION OF EMBODIMENTS

Figure 1:
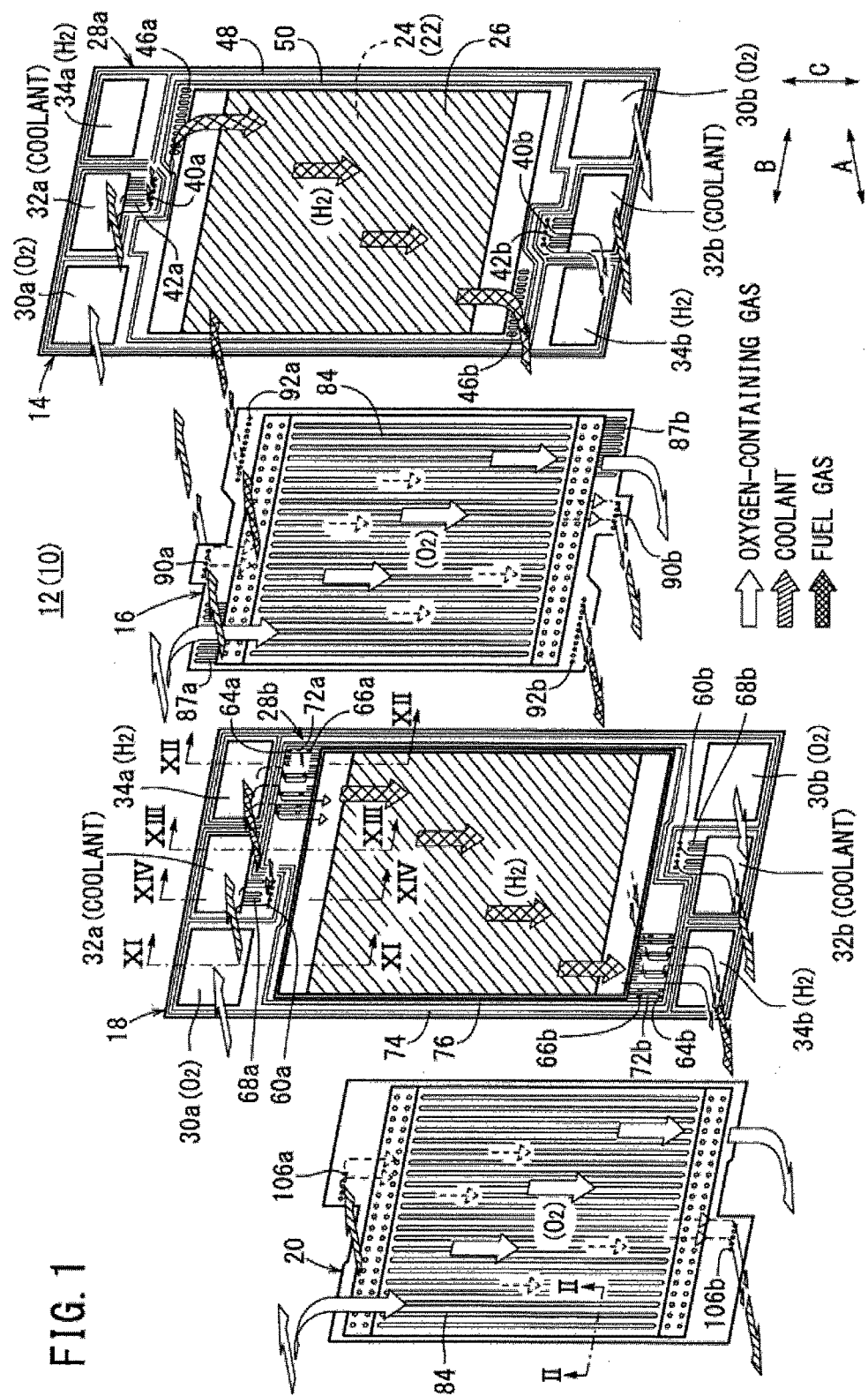
FIG. 1 is an exploded perspective view showing a fuel cell according to a first embodiment of the present invention.
Figure 2:
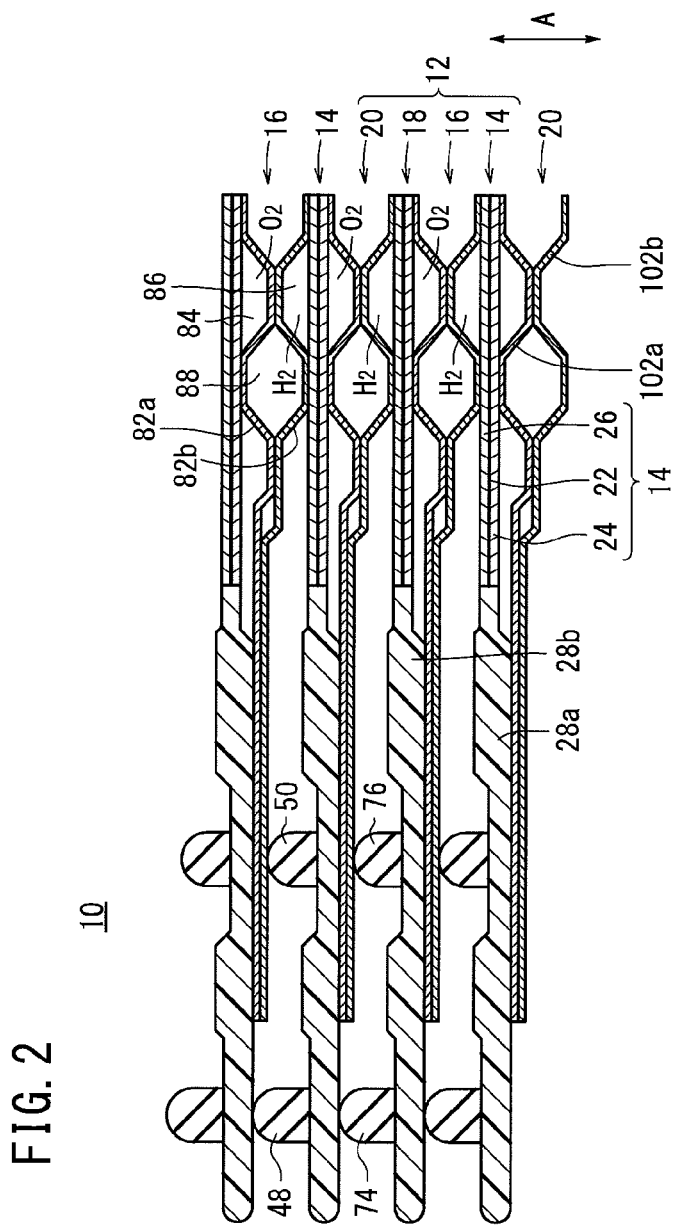
FIG. 2 is a cross sectional view showing the fuel cell, taken along a line II-II in FIG. 1.

As shown in FIGS. 1 and 2, a fuel cell 10 according to a first embodiment of the present invention is formed by stacking a plurality of cell units 12 in a horizontal direction indicated by an arrow A.

The cell unit 12 includes a first membrane electrode assembly (electrolyte electrode assembly) (MEA) 14, a first separator 16, a second membrane electrode assembly (electrolyte electrode assembly) (MEA) 18, and a second separator 20. By stacking the cell units 12, the first membrane electrode assembly 14 is sandwiched between the second and first separators 20, 16, and the second membrane electrode assembly 18 is sandwiched between the first and second separators 16, 20.

As described later, the first separator 16 and the second separator 20 are formed by corrugating metal thin plates by pressure forming. Alternatively, the carbon separators may be used as the first separator 16 and the second separator 20.

Each of the first membrane electrode assembly 14 and the second membrane electrode assembly 18 includes a cathode 24, an anode 26, and a solid polymer electrolyte membrane (electrolyte) 22 interposed between the cathode 24 and the anode 26 (see FIG. 2). For example, the solid polymer electrolyte membrane 22 is formed by impregnating a thin membrane of perfluorosulfonic acid with water.

In the first membrane electrode assembly 14, the surface area of the solid polymer electrolyte membrane 22 is identical with the surface area of the cathode 24 and the surface area of the anode 26. It should be noted that the outer circumferential end of the solid polymer electrolyte membrane 22 may protrude beyond the cathode 24 and the anode 26. The surface area of the cathode 24 may be different from the surface area of the anode 26.

In the first membrane electrode assembly 14, a frame 28a (e.g., a first frame member) made of insulating polymer material is formed integrally with the outer circumferential ends of the solid polymer electrolyte membrane 22, the cathode 24, and the anode 26, e.g., by injection molding. Likewise, in the second membrane electrode assembly 18, a frame 28b (e.g., a second frame member) made of polymer material is formed integrally with the outer circumferential ends of the solid polymer electrolyte membrane 22, the cathode 24, and the anode 26, e.g., by injection molding. For example, engineering plastics and super engineering plastics as well as commodity plastics may be adopted as the polymer material.

Each of the cathode 24 and the anode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer contacts the solid polymer electrolyte membrane 22.

As shown in FIG. 1, at one end (upper end) of the frames 28a, 28b in a vertical direction indicated by an arrow C, an oxygen-containing gas supply passage 30a for supplying an oxygen-containing gas, a coolant supply passage 32a for supplying a coolant, and a fuel gas supply passage 34a for supplying a fuel gas such as a hydrogen-containing gas are arranged in a horizontal direction indicated by an arrow B.

At the other end (lower end) of the frames 28a, 28b in the direction indicated by the arrow C, a fuel gas discharge passage 34b for discharging the fuel gas, a coolant discharge passage 32b for discharging the coolant, and an oxygen-containing gas discharge passage 30b for discharging the oxygen-containing gas are arranged in the direction indicated by the arrow B.

As long as the oxygen-containing gas supply passage 30a, the coolant supply passage 32a, the fuel gas supply passage 34a, the oxygen-containing gas discharge passage 30b, the coolant discharge passage 32b, and the fuel gas discharge passage 34b are provided in the frames 28a, 28b, the positions of the oxygen-containing gas supply passage 30a, the coolant supply passage 32a, the fuel gas supply passage 34a, the oxygen-containing gas discharge passage 30b, the coolant discharge passage 32b, and the fuel gas discharge passage 34b are not limited.

Figure 3:
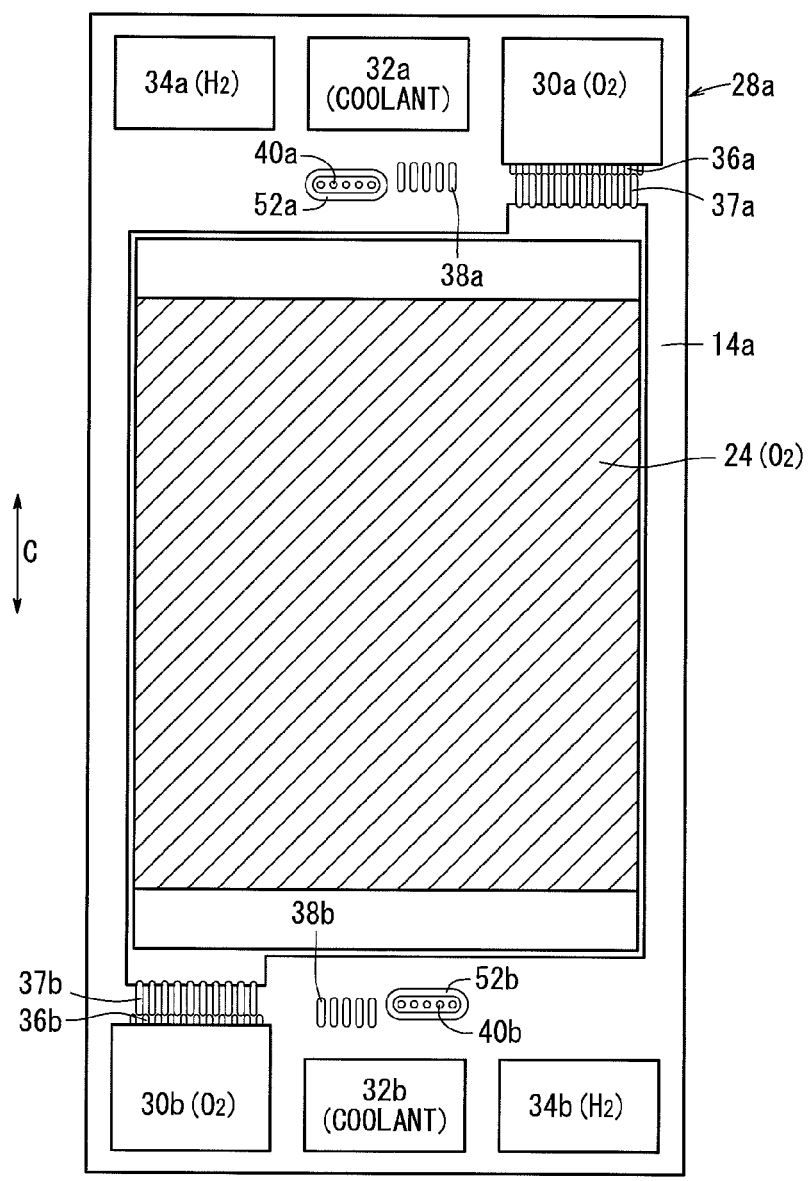
FIG. 3 is a view showing a cathode surface of a first membrane electrode assembly of the fuel cell.

As shown in FIG. 3, the frame 28a has a plurality of inlet ridges 36a and a plurality of inlet grooves 37a at upper positions of a cathode surface (the surface where the cathode 24 is provided) 14a of the first membrane electrode assembly 14, adjacent to the lower portion of the oxygen-containing gas supply passage 30a. Further, the frame 28a has a plurality of inlet grooves 38a at upper positions of the cathode surface 14a, adjacent to the lower portion of the coolant supply passage 32a, and adjacent to the oxygen-containing gas supply passage 30a. Further, a plurality of inlet holes 40a extend through the frame 28a, at positions adjacent to the lower portion of the coolant supply passage 32a, and adjacent to the fuel gas supply passage 34a.

The frame 28a has a plurality of outlet ridges 36b and a plurality of outlet grooves 37b at lower positions of the cathode surface 14a of the first membrane electrode assembly 14, adjacent to the upper portion of the oxygen-containing gas discharge passage 30b. Further, the frame 28a has a plurality of outlet grooves 38b at lower positions of the cathode surface 14a, adjacent to the upper portion of the coolant discharge passage 32b, and adjacent to the oxygen-containing gas discharge passage 30b. Further, a plurality of outlet holes 40b extend through the frame 28a, at positions adjacent to the upper portion of the coolant discharge passage 32b, and adjacent to the fuel gas discharge passage 34b.

Figure 4:
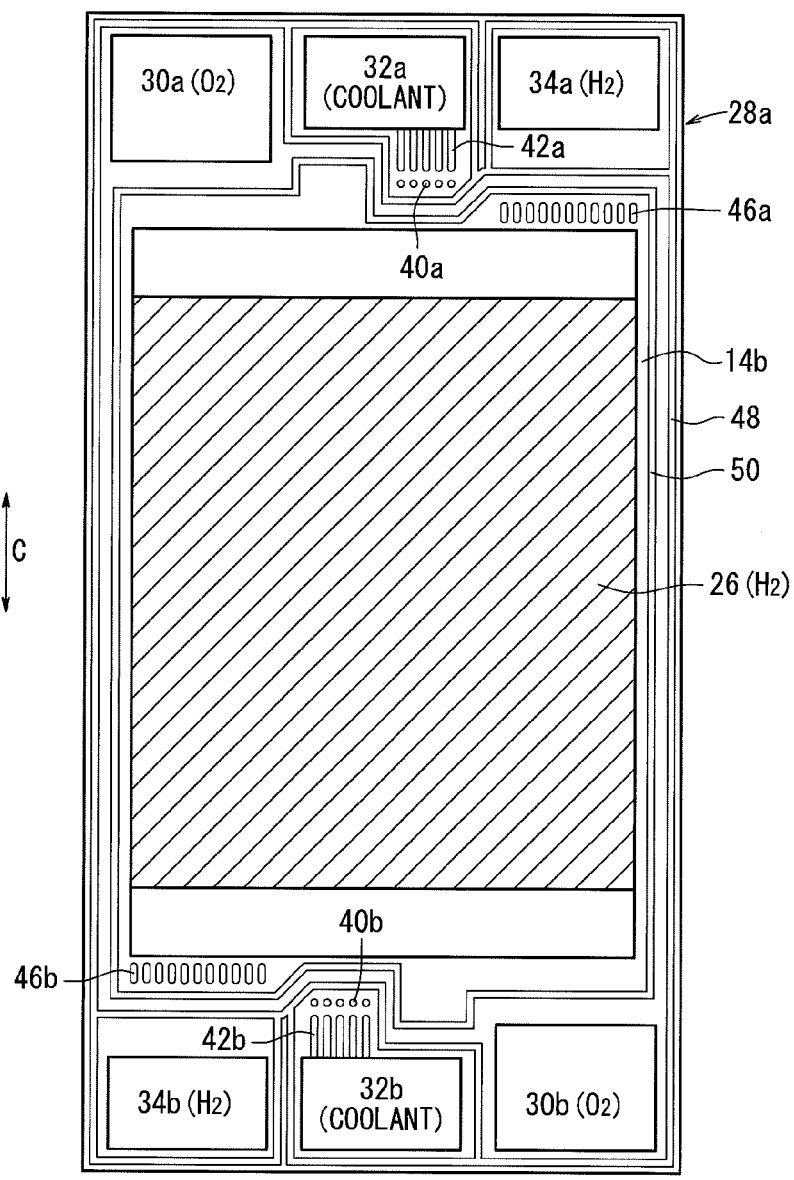
FIG. 4 is a view showing an anode surface of the first membrane electrode assembly.

As shown in FIG. 4, the frame 28a has a plurality of inlet grooves 42a at upper positions of an anode surface (the surface where the anode 26 is provided) 14b of the first membrane electrode assembly 14, adjacent to the lower portion of the coolant supply passage 32a, and adjacent to the fuel gas supply passage 34a. A plurality of inlet holes 40a extend through the frame 28a, at positions adjacent to the lower portions of the inlet grooves 42a. The frame 28a has a plurality of inlet grooves 46a below the fuel gas supply passage 34a.

The frame 28a has a plurality of outlet grooves 42b at lower positions of the anode surface 14b of the first membrane electrode assembly 14, adjacent to the upper portion of the coolant discharge passage 32b, and adjacent to the fuel gas discharge passage 34b. A plurality of outlet holes 40b extend through the frame 28a, at positions adjacent to the upper portions of the outlet grooves 42b. The frame 28a has a plurality of outlet grooves 46b above the fuel gas discharge passage 34b.

An outer seal member (outer seal line) 48 and an inner seal member (inner seal line) 50 are provided integrally with the anode surface 14b of the frame 28a. Alternatively, the outer seal member 48 and the inner seal member 50 may be formed separately from the frame 28a, and provided on the anode surface 14b of the frame 28a. Each of the outer seal member 48 and the inner seal member 50 is an elastic seal made of seal material, cushion material, or packing material such as an EPDM rubber (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber. Seal members as described later have the same structure as that of the outer seal member 48 and the inner seal member 50, and description thereof will be omitted.

The outer seal member 48 is provided along the outer circumferential end of the frame 28a, around all of the fluid passages, i.e., the oxygen-containing gas supply passage 30a, the coolant supply passage 32a, the fuel gas supply passage 34a, the oxygen-containing gas discharge passage 30b, the coolant discharge passage 32b, and the fuel gas discharge passage 34b, and around the reaction surface (power generation surface). The outer seal member 48 surrounds the coolant supply passage 32a, the fuel gas supply passage 34a, the coolant discharge passage 32b, and the fuel gas discharge passage 34b. The outer seal member 48 surrounds the inlet grooves 42a, the inlet holes 40a, and the coolant supply passage 32a together, and surrounds the outlet grooves 42b, the outlet holes 40b, and the coolant discharge passage 32b together.

The inner seal member 50 is positioned inside the outer seal member 48, and surrounds the anode 26, the inlet grooves 46a, and the outlet grooves 46b together.

The inner seal member 50 is provided along a profile line corresponding to the outer shape of the first separator 16, and contacts the entire outer circumferential end surface of the first separator 16 (within the separator surface). The outer seal member 48 is provided around the outer circumferential end of the first separator 16 (outside the separator surface). All of the fluid passages are hermetically surrounded by the outer seal member 48 and the inner seal member 50.

As shown in FIG. 3, on the cathode surface 14a of the frame 28a, a ring-shaped inlet seal member 52a surrounding the inlet holes 40a and a ring-shaped outlet seal member 52b surrounding the outlet holes 40b are provided.

Figure 5:
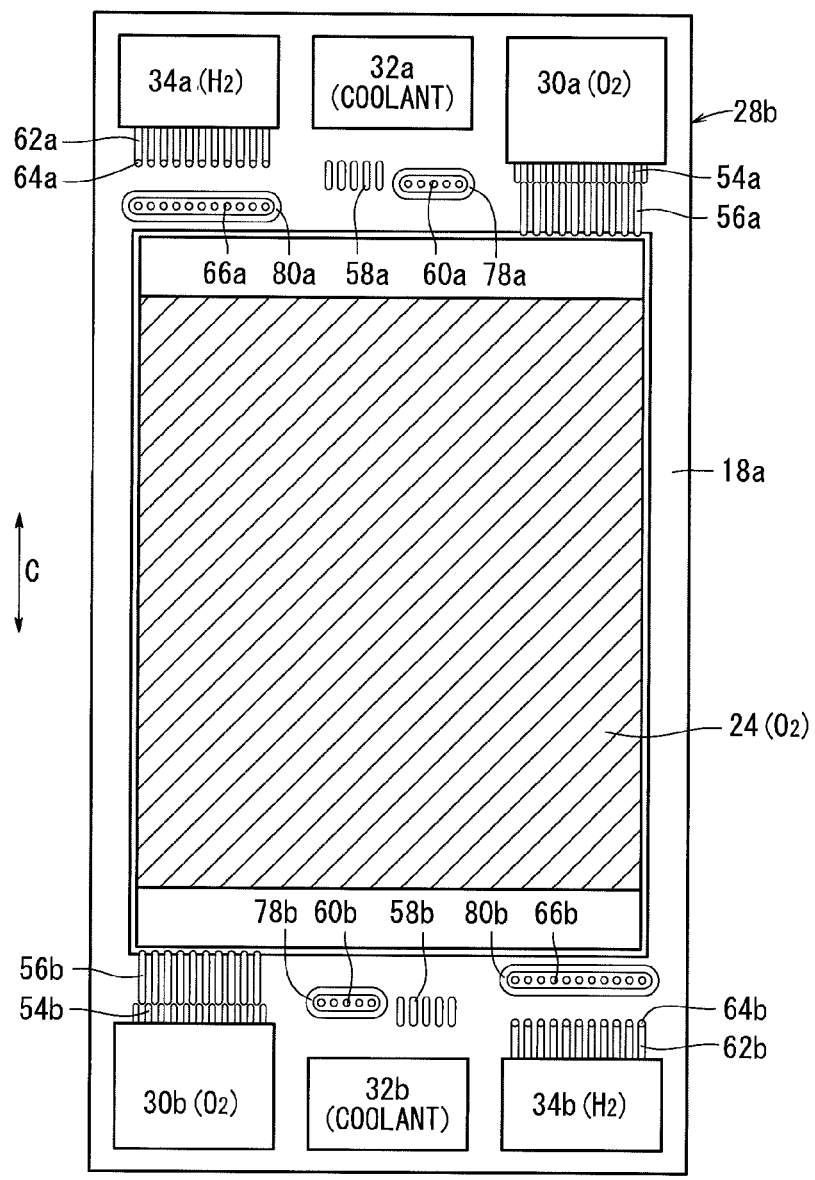
FIG. 5 is a view showing a cathode surface of a second membrane electrode assembly of the fuel cell.

As shown in FIG. 5, the frame 28b has a plurality of inlet ridges 54a and a plurality of inlet grooves 56a at upper positions of a cathode surface (the surface where the cathode 24 is provided) 18a of the second membrane electrode assembly 18, adjacent to the lower portion of the oxygen-containing gas supply passage 30a.

The frame 28b has a plurality of inlet grooves 58a at upper positions of the cathode surface 18a, adjacent to the lower portion of the coolant supply passage 32a, and adjacent to the fuel gas supply passage 34a. A plurality of inlet holes 60a are formed adjacent to the lower portion of the coolant supply passage 32a, and adjacent to the oxygen-containing gas supply passage 30a. The inlet holes 60a of the second membrane electrode assembly 18 are offset from the inlet holes 40a of the first membrane electrode assembly 14 such that the inlet holes 60a and the inlet holes 40a are not overlapped with each other as viewed from the stacking direction.

The frame 28b has a plurality of inlet grooves 62a at upper positions of the cathode surface 18a, adjacent to the lower portion of the fuel gas supply passage 34a. A plurality of inlet holes 64a extend through the frame 28b at the lower ends of the inlet grooves 62a. A plurality of inlet holes 66a extend through the frame 28b below the inlet holes 64a, at positions spaced at predetermined distances from the inlet holes 64a.

The frame 28b has a plurality of outlet grooves 58b at lower positions of the cathode surface 18a of the frame 28b, adjacent the upper portion of the coolant discharge passage 32b, and adjacent to the fuel gas discharge passage 34b. Further, a plurality of outlet holes 60b are formed adjacent to the upper portion of the coolant discharge passage 32b, and adjacent to the oxygen-containing gas discharge passage 30b. The outlet holes 60b of the second membrane electrode assembly 18 are offset from the outlet holes 40b of the first membrane electrode assembly 14 such that the outlet holes 60b and the outlet holes 40b are not overlapped with each other as viewed from the stacking direction.

The frame 28b has a plurality of outlet grooves 62b at lower positions of the cathode surface 18a, adjacent to the upper portion of the fuel gas discharge passage 34b. A plurality of outlet holes 64b extend through the frame 28b at the upper ends of the outlet grooves 62b. A plurality of outlet holes 66b extend through the frame 28b above the outlet holes 64b, at positions spaced at predetermined distances from the outlet holes 64b.

Figure 6:
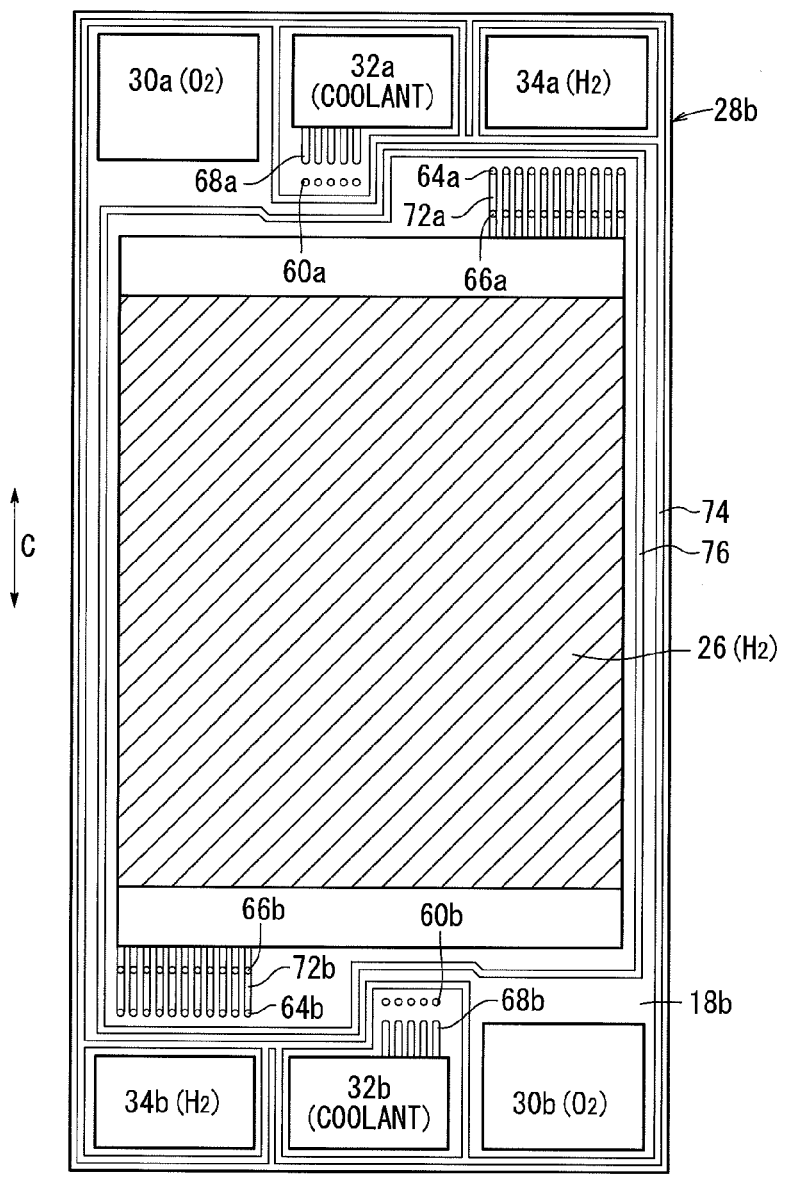
FIG. 6 is a view showing an anode surface of the second membrane electrode assembly.

As shown in FIG. 6, the frame 28b has a plurality of inlet grooves 68a at upper positions of an anode surface (the surface where the anode 26 is provided) 18b of the second membrane electrode assembly 18, adjacent to the lower portion of the coolant supply passage 32a, and adjacent to the oxygen-containing gas supply passage 30a. A plurality of inlet holes 60a extend through the frame 28b, adjacent to the lower portions of the inlet grooves 68a. The frame 28b has a plurality of inlet grooves 72a below the fuel gas supply passage 34a. The inlet grooves 72a connect the inlet holes 64a, 66a.

The frame 28b has a plurality of outlet grooves 68b at lower positions of the anode surface 18b, adjacent to the upper portions of the coolant discharge passage 32b, and adjacent to the oxygen-containing gas discharge passage 30b. A plurality of outlet holes 60b extend through the frame 28b, adjacent to the upper portions of the outlet grooves 68b. The frame 28b has a plurality of outlet grooves 72b above the fuel gas discharge passage 34b. The outlet grooves 72b connect the outlet holes 64b, 66b.

An outer seal member (outer seal line) 74 and an inner seal member (inner seal line) 76 are provided integrally with the anode surface 18b of the frame 28b. Alternatively, the outer seal member 74 and the inner seal member 76 may be formed separately from the frame 28b, and provided on the anode surface 18b of the frame 28b. The outer seal member 74 is provided along the outer circumferential end of the frame 28b, around all of the fluid passages, i.e., the oxygen-containing gas supply passage 30a, the coolant supply passage 32a, the fuel gas supply passage 34a, the oxygen-containing gas discharge passage 30b, the coolant discharge passage 32b, and the fuel gas discharge passage 34b.

The outer seal member 74 surrounds the coolant supply passage 32a, the fuel gas supply passage 34a, the coolant discharge passage 32b, and the fuel gas discharge passage 34b. The outer seal member 74 surrounds the inlet grooves 68a, the inlet holes 60a, and the coolant supply passage 32a together, and surrounds the outlet grooves 68b, the outlet holes 60b, and the coolant discharge passage 32b together.

The inner seal member 76 is positioned inside the outer seal member 74, and surrounds the anode 26, the inlet holes 64a, 66a, the inlet grooves 72a, the outlet holes 64b, 66b, and the outlet grooves 72b together.

The inner seal member 76 is provided along a profile line corresponding to the outer shape of the second separator 20, and contacts the entire outer circumferential end surface of the second separator 20. The outer seal member 74 is provided around the outer circumferential end of the second separator 20. All of the fluid passages are hermetically surrounded by the outer seal member 74 and the inner seal member 76.

As shown in FIG. 5, on the cathode surface 18a of the frame 28b, ring-shaped inlet seal members 78a, 80a surrounding the inlet holes 60a, 66a and ring-shaped outlet seal members 78b, 80b surrounding the outlet holes 60b, 66b are provided.

The first and second separators 16, 20 are dimensioned such that the first and second separators 16, 20 are provided on an inward side relative to the oxygen-containing gas supply passage 30a, the coolant supply passage 32a, the fuel gas supply passage 34a, the oxygen-containing gas discharge passage 30b, the coolant discharge passage 32b, and the fuel gas discharge passage 34b (all of the fluid passages).

As shown in FIG. 2, the first separator 16 includes two metal plates (e.g., stainless plates) 82a, 82b having the same outer shape. The metal plates 82a, 82b are stacked together. The outer circumferential ends of the metal plates 82a, 82b are welded or bonded together to form a hermetical internal space between the metal plates 82a, 82b. An oxygen-containing gas flow field 84 facing the cathode 24 is formed on the metal plate 82a, and a fuel gas flow field 86 facing the anode 26 is formed on the metal plate 82b. A coolant flow field 88 is formed in the internal space between the metal plates 82a, 82b.

Figure 7:
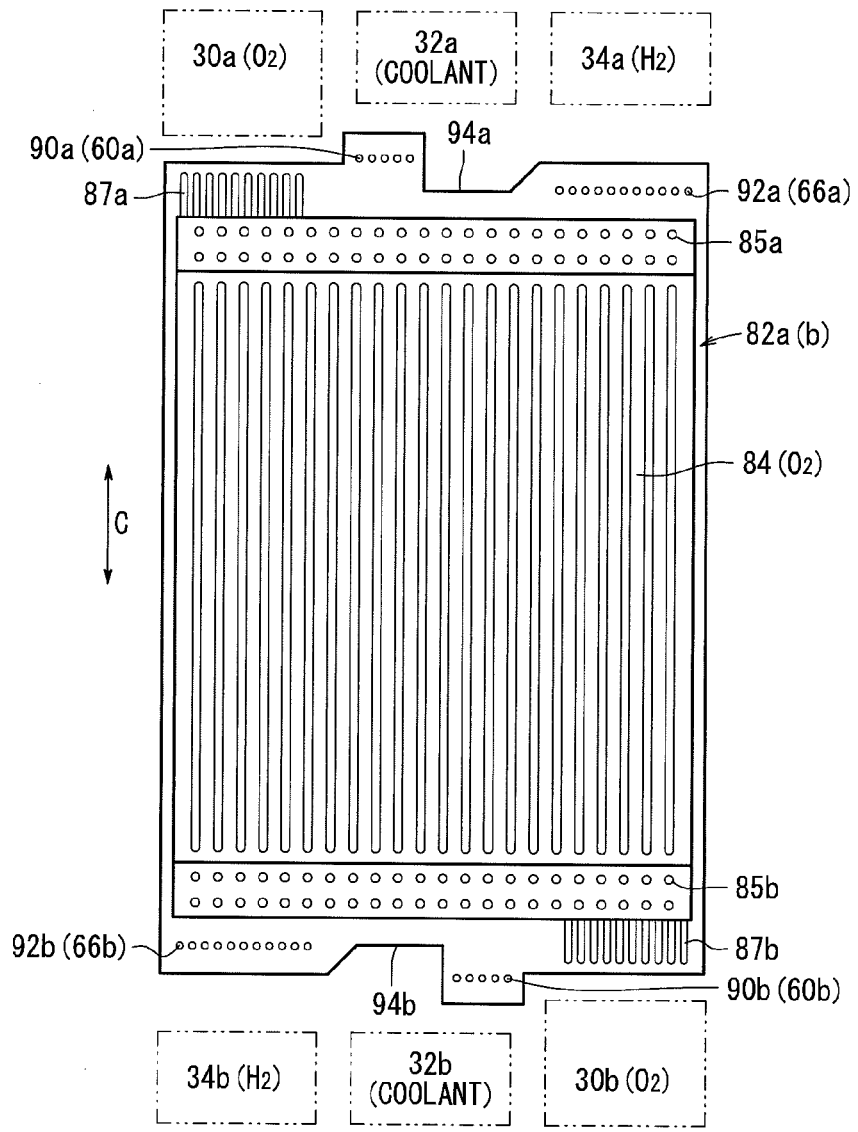
FIG. 7 is a view showing a cathode surface of a first separator of the fuel cell.

As shown in FIG. 7, the first separator 16 has the oxygen-containing gas flow field 84 on the surface of the metal plate 82a. The oxygen-containing gas flow field 84 includes a plurality of flow grooves extending in the vertical direction indicated by the arrow C. An inlet buffer 85a is provided on the upstream side of the oxygen-containing gas flow field 84, and an outlet buffer 85b is provided on the downstream side of the oxygen-containing gas flow field 84. A plurality of inlet grooves 87a are formed above the inlet buffer 85a and below the oxygen-containing gas supply passage 30a. A plurality of outlet grooves 87b are formed below the outlet buffer 85b and above the oxygen-containing gas discharge passage 30b.

A plurality of holes 90a and a plurality of holes 92a are formed at upper positions of the metal plate 82a. The holes 90a are connected to the inlet holes 60a of the second membrane electrode assembly 18, and the holes 92a are connected to the inlet holes 66a of the second membrane electrode assembly 18. The holes 92a are also formed in the metal plate 82b, and extend through the first separator 16.

A plurality of holes 90b and a plurality of holes 92b are formed at lower positions of the metal plate 82a. The holes 90b are connected to the outlet holes 60b of the second membrane electrode assembly 18, and the holes 92b are connected to the outlet holes 66b of the second membrane electrode assembly 18. The holes 92b are also formed in the metal plate 82b, and extend through the first separator 16.

The first separator 16 includes an upper recess 94a in order to avoid the inlet holes 40a of the first membrane electrode assembly 14, and a lower recess 94b in order to avoid the outlet holes 40b of the first membrane electrode assembly 14.

Figure 8:
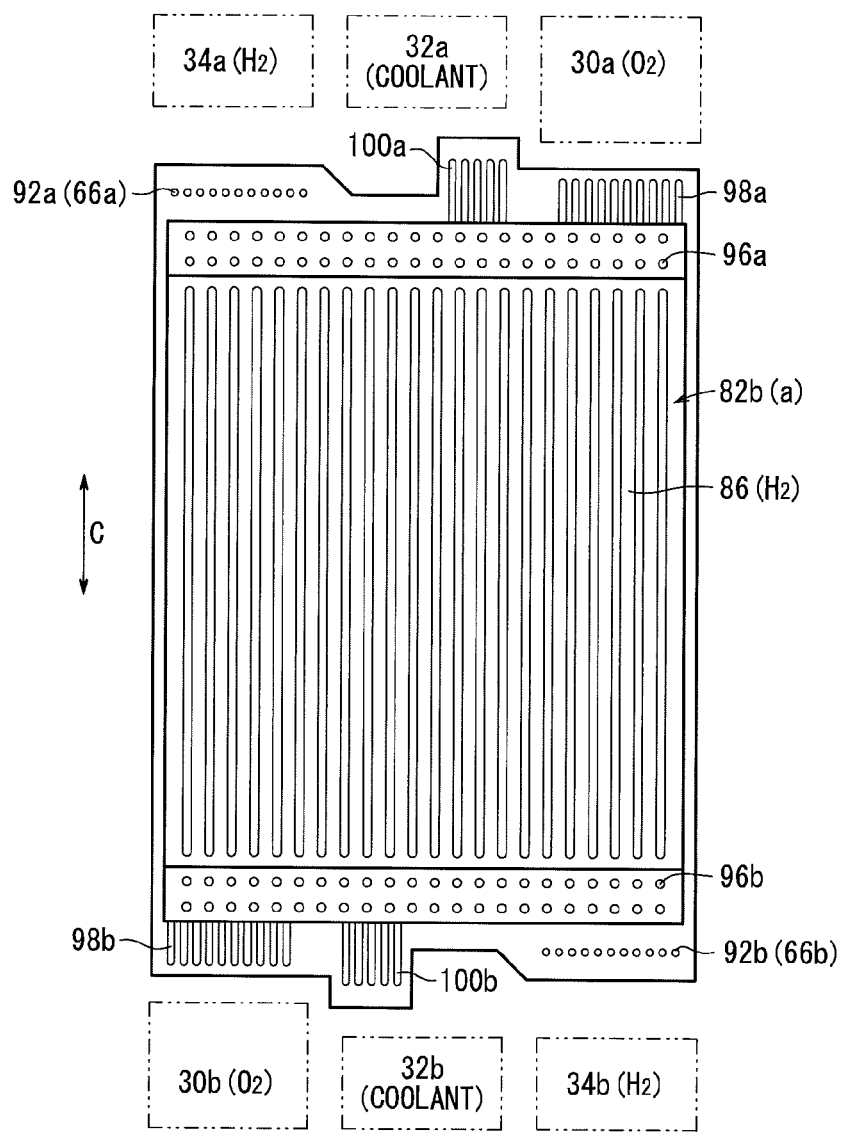
FIG. 8 is a view showing an anode surface of the first separator.

As shown in FIG. 8, the first separator 16 has the fuel gas flow field 86 on the surface of the metal plate 82b. The fuel gas flow field 86 includes a plurality of flow grooves extending in the vertical direction indicated by the arrow C. An inlet buffer 96a is provided on the upstream side of the fuel gas flow field 86, and an outlet buffer 96b is provided on the downstream side of the fuel gas flow field 86. A plurality of inlet grooves 98a are formed above the inlet buffer 96a and below the oxygen-containing gas supply passage 30a, and a plurality of inlet grooves 100a are provided above the inlet buffer 96a and below the coolant supply passage 32a. The inlet grooves 100a have a ridge-and-groove structure to form coolant channels inside the first separator 16.

A plurality of outlet grooves 98b are formed below the outlet buffer 96b and above the oxygen-containing gas discharge passage 30b, and a plurality of outlet grooves 100b are provided below the outlet buffer 96b and above the coolant discharge passage 32b. The outlet grooves 100b have a ridge-and-groove structure to form a coolant channel inside the first separator 16.

As shown in FIG. 2, the second separator 20 includes two metal plates (e.g., stainless plates) 102a, 102b having the same outer shape. The metal plates 102a, 102b are stacked together. The outer circumferential ends of the metal plates 102a, 102b are welded or bonded together, and the internal space between the metal plates 102a, 102b is closed hermetically. An oxygen-containing gas flow field 84 is formed on the metal plate 102a to face the cathode 24, and a fuel gas flow field 86 is formed on the metal plate 102b to face the anode 26. A coolant flow field 88 is formed between the metal plates 102a, 102b.

Figure 9:
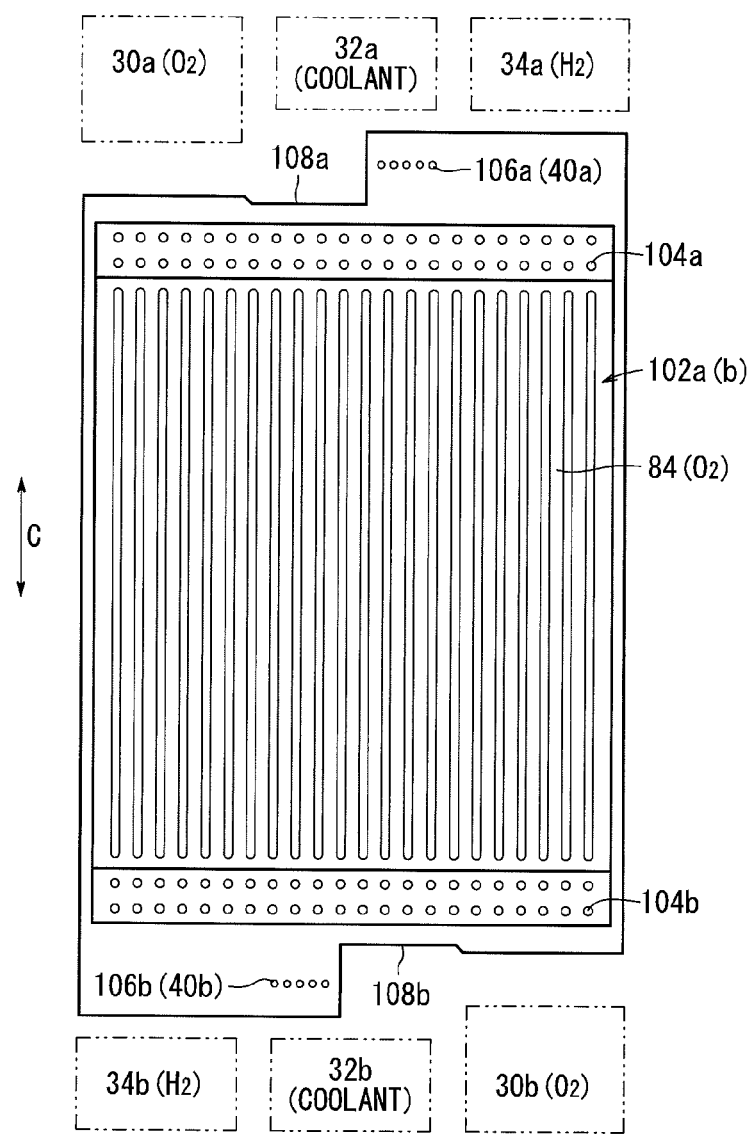
FIG. 9 is a view showing a cathode surface of a second separator of the fuel cell.

As shown in FIG. 9, the second separator 20 has an oxygen-containing gas flow field 84 on the surface of the metal plate 102a. The oxygen-containing gas flow field 84 includes a plurality of flow grooves extending in the vertical direction indicated by the arrow C. An inlet buffer 104a is provided on the upstream side of the oxygen-containing gas flow field 84, and an outlet buffer 104b is provided on the downstream side of the oxygen-containing gas flow field 84. A plurality of holes 106a are formed at upper positions of the metal plate 102a. The holes 106a are connected to the inlet holes 40a of the first membrane electrode assembly 14. Further, a plurality of holes 106b are formed at lower positions of the metal plate 102a. The holes 106b are connected to the outlet holes 40b of the first membrane electrode assembly 14.

The second separator 20 includes an upper recess 108a in order to avoid the inlet holes 60a of the second membrane electrode assembly 18, and a lower recess 108b in order to avoid the outlet holes 60b of the second membrane electrode assembly 18.

Figure 10:
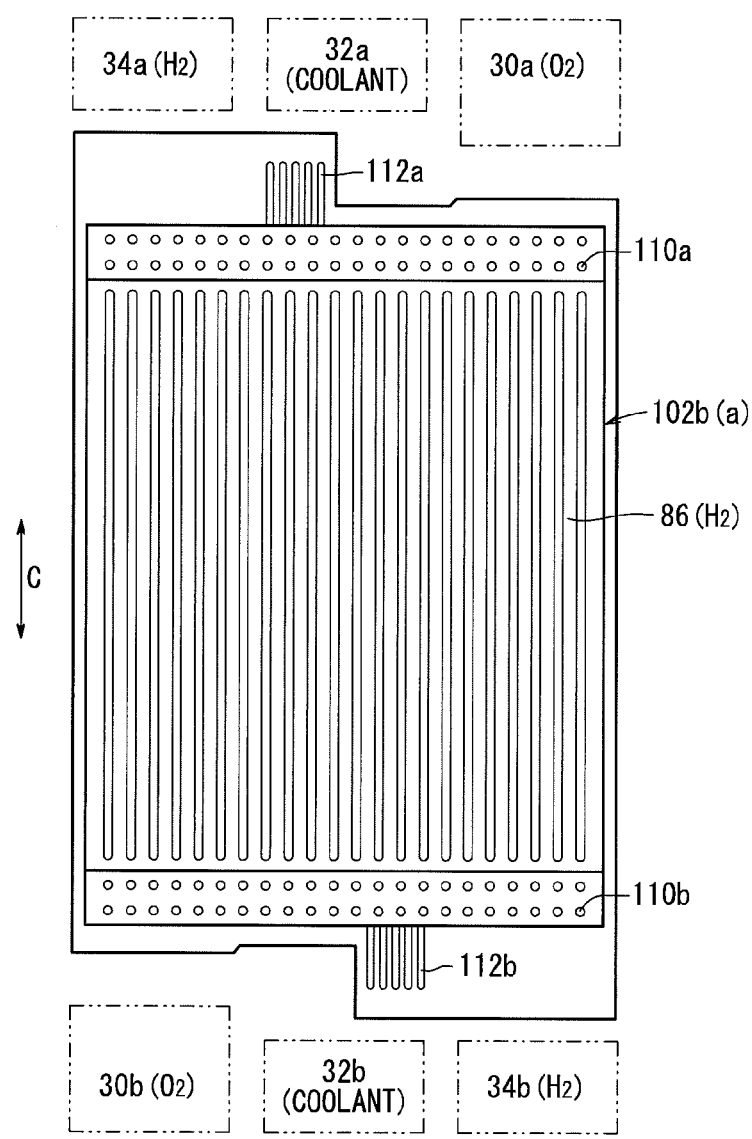
FIG. 10 is a view showing an anode surface of the second separator.

As shown in FIG. 10, the second separator 20 has the fuel gas flow field 86 on a surface of the metal plate 102b. The fuel gas flow field 86 includes a plurality of flow grooves extending in the vertical direction indicated by the arrow C. An inlet buffer 110a is provided on the upstream side of the fuel gas flow field 86, and an outlet buffer 110b is provided on the downstream side of the fuel gas flow field 86.

A plurality of inlet grooves 112a are formed at upper positions of the metal plate 102b and below the coolant supply passage 32a, and a plurality of outlet grooves 112b are formed at lower positions of the metal plate 102b and above the coolant discharge passage 32b. Both of the inlet grooves 112a and the outlet grooves 112b have a ridge-and-groove structure to form coolant channels in the second separator 20.

Figure 11:
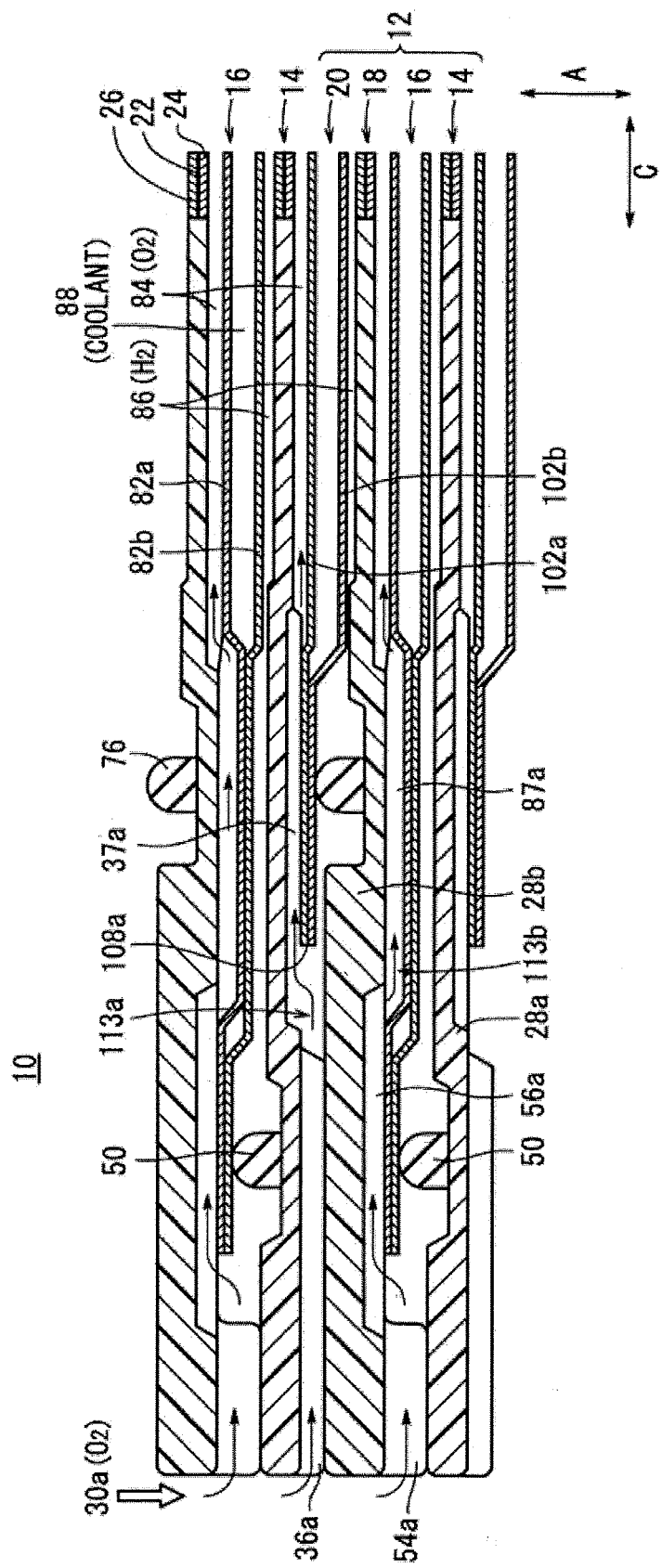
FIG. 11 is a cross sectional view showing the fuel cell, taken along a line XI-XI in FIG. 1.

As shown in FIG. 11, an oxygen-containing gas connection channel 113a and an oxygen-containing gas connection channel 113b are formed between the frames 28a, 28b that are adjacent to each other in the stacking direction. The oxygen-containing gas connection channel 113a connects the oxygen-containing gas supply passage 30a and the oxygen-containing gas flow field 84 of the first membrane electrode assembly 14, and the oxygen-containing gas connection channel 113b connects the oxygen-containing gas supply passage 30a and the oxygen-containing gas flow field 84 of the second membrane electrode assembly 18. Though not shown, oxygen-containing gas connection channels connecting the oxygen-containing gas discharge passage 30b and the oxygen-containing gas flow field 84 are formed between the frames 28a, 28b in the same manner.

The oxygen-containing gas connection channel 113a and the oxygen-containing gas connection channel 113b are formed by arranging the outer seal member 48 and the inner seal member 50 of the frame 28a, and the outer seal member 74 and the inner seal member 76 of the frame 28b at different positions as viewed from the stacking direction.

The oxygen-containing gas connection channel 113b includes the inlet ridges 54a formed on the surface of the frame 28b and extending along the separator surface, the inlet grooves 56a (e.g., a first set of grooves) formed in the frame 28b, and the inlet grooves 87a formed in the surface of the metal plate 82a of the first separator 16. The inlet grooves 87a are connected to grooves between the inlet ridges 54a, and extend along the separator surface. Ends of the inlet grooves 56a are connected to ends of the inlet grooves 87a.

The oxygen-containing gas connection channel 113a includes the inlet ridges 36a formed on the surface of the frame 28a and extending along the separator surface, and the inlet grooves 37a. formed on the surface of the frame 28a and extending along the separator surface, and the inlet grooves 37a (e.g., a second set of grooves).

Figure 12:
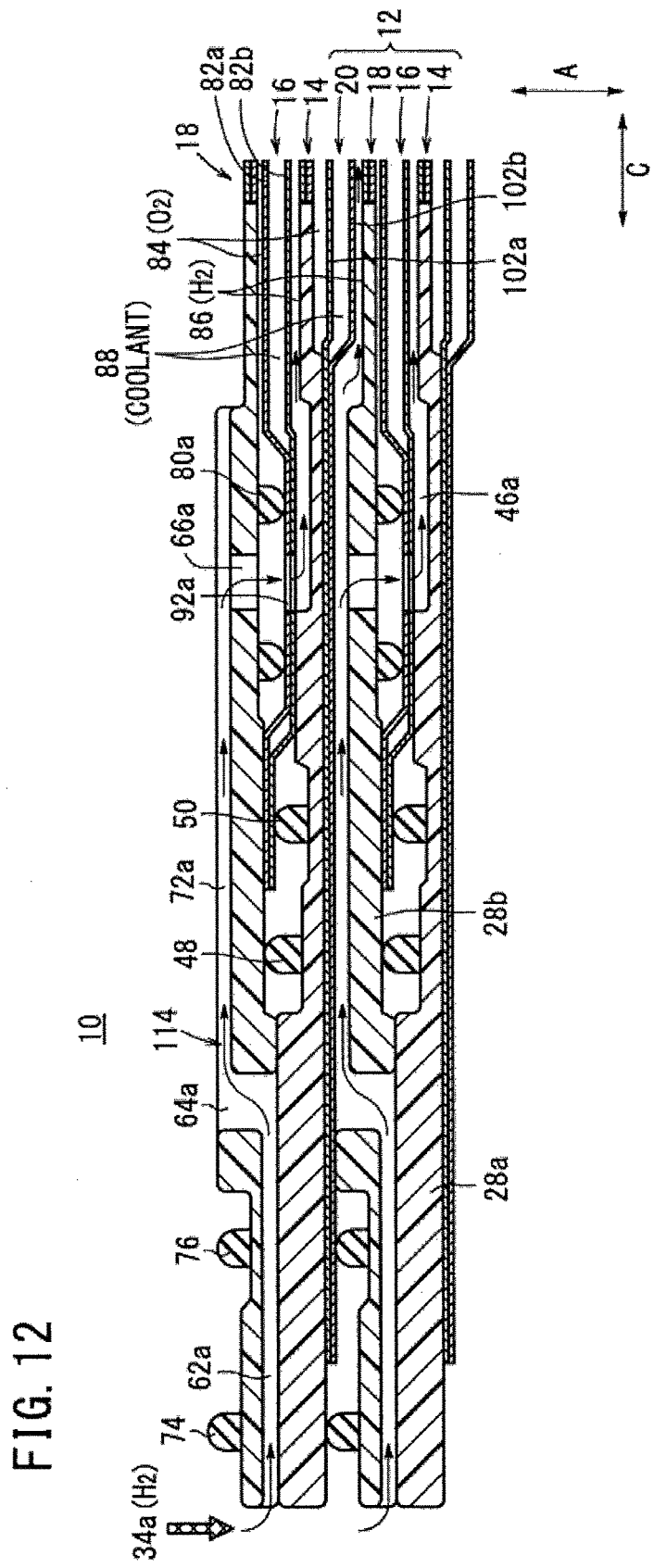
FIG. 12 is a cross sectional view showing the fuel cell, taken along a line XII-XII in FIG. 1.

As shown in FIG. 12, a fuel gas connection channel 114 is formed between the frames 28a, 28b that are adjacent to each other in the stacking direction. The fuel gas connection channel 114 connects the fuel gas supply passage 34a and the fuel gas flow field 86. Though not shown, a fuel gas connection channel connecting the fuel gas discharge passage 34b and the fuel gas flow field 86 is formed between the frames 28a, 28b in the same manner.

The fuel gas connection channels are formed by arranging the outer seal member 48 and the inner seal member 50 of the frame 28a, and the outer seal member 74 and the inner seal member 76 of the frame 28b at different positions as viewed from the stacking direction.

The fuel gas connection channel 114 includes the inlet grooves 62 a (e.g., a first set of grooves), 72 a (e.g., a second set of grooves) formed in the frame 28 b of the second membrane electrode assembly 18 and extending along the separator surface, and the holes 92 a extending through the outer circumferential end of the first separator 16 in the stacking direction. It should be noted that the inlet grooves 62 a may be provided in the frame 28 a of the first membrane electrode assembly 14.

More specifically, the frame 28b has the inlet holes (first through holes) 64a and the inlet holes (second through holes) 66a, and the inlet grooves 62a, 72a formed on both surfaces of the frame 28b are connected to each other through the inlet holes 64a. The inlet holes 66a are provided coaxially with, or offset from the holes 92a in the stacking direction. The inlet grooves 62a, 72a are connected from the holes 92a to the fuel gas flow field (first reactant gas flow field) 86 of the first separator 16 through the inlet holes 66a. The inlet grooves 72a are directly connected to the fuel gas flow field 86 of the second separator 20.

Figure 13:
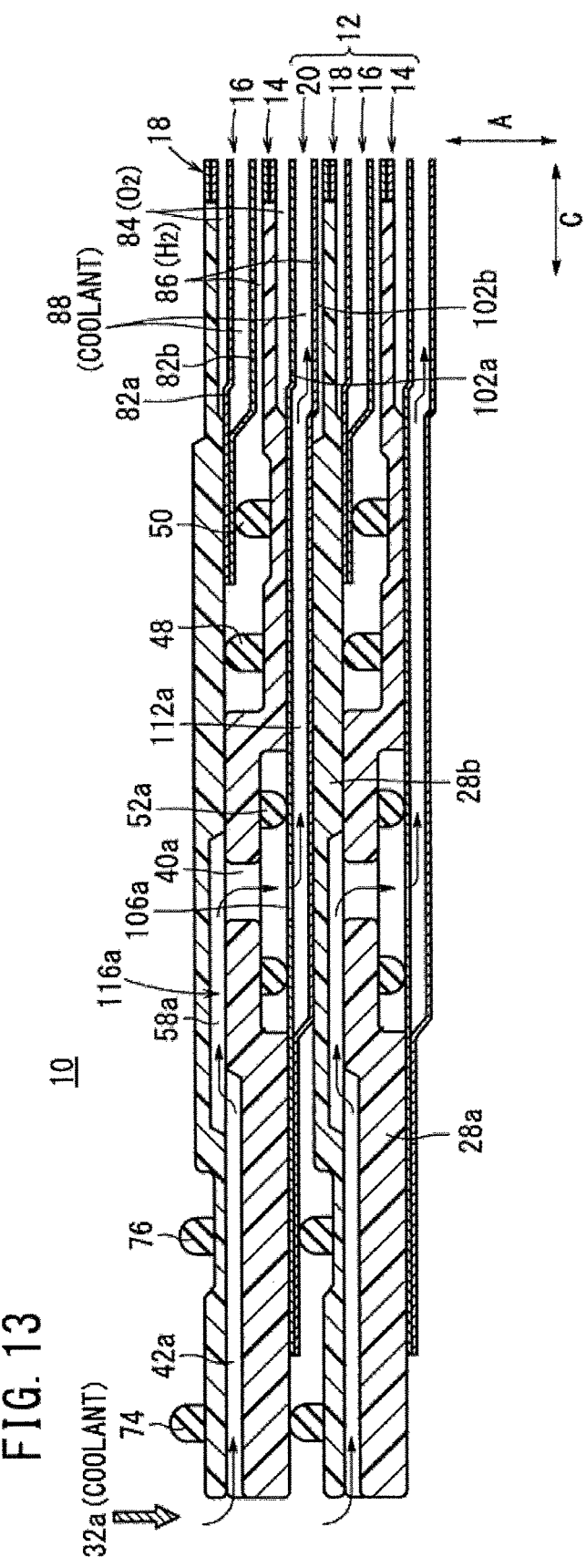
FIG. 13 is a cross sectional view showing the fuel cell, taken along a line XIII-XIII in FIG. 1.
Figure 14:
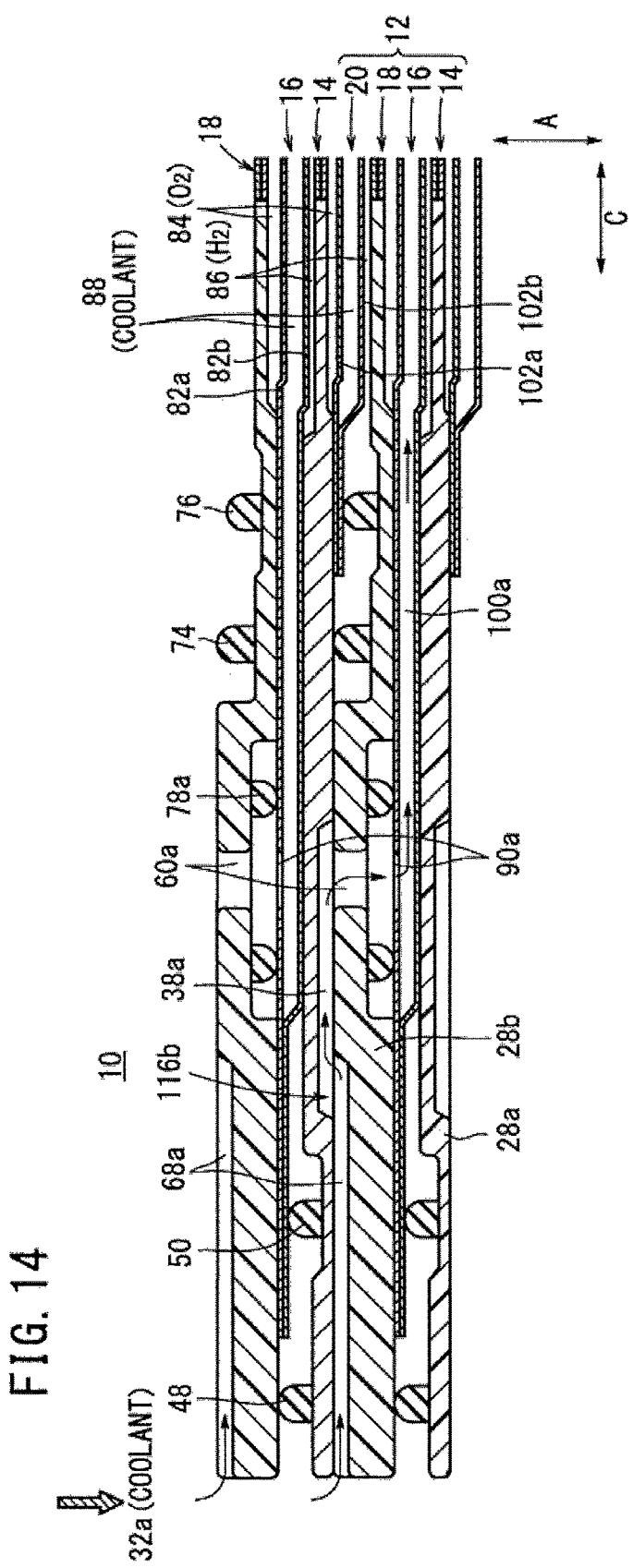
FIG. 14 is a cross sectional view showing the fuel cell, taken along a line XIV-XIV in FIG. 1.

As shown in FIGS. 13 and 14, a coolant connection channel 116a and a coolant connection channel 116b are formed between the frames 28a, 28b that are adjacent to each other in the stacking direction. The coolant connection channel 116a connects the coolant supply passage 32a and the coolant flow field 88 of the second separator 20. The coolant connection channel 116b connects the coolant supply passage 32a and the coolant flow field 88 of the first separator 16. Though not shown, a coolant connection channels connecting the coolant discharge passage 32b and the coolant flow field 88 are formed between the frames 28a, 28b.

The coolant connection channels 116a, 116b are formed by arranging the outer seal member 48 and the inner seal member 50 of the frame 28a, and the outer seal member 74 and the inner seal member 76 of the frame 28b at different positions as viewed from the stacking direction. It should be noted that the coolant connection channels 116a, 116b may be formed in one of the frame 28a and the frame 28b.

As shown in FIG. 13, the coolant connection channel 116 a includes the inlet grooves 42 a (e.g., a first set of grooves), 58 a (e.g., a second set of grooves) provided along the separator surface, the inlet holes (first holes) 40 a formed in the frame 28 a in the stacking direction, and the holes (second holes) 106 a formed in the metal plate 102 a of the second separator 20 in the stacking direction. Ends of the inlet grooves 42 a and ends of the inlet grooves 58 a are connected together.

As shown in FIG. 14, the coolant connection channel 116b includes the inlet grooves 68a, 38a provided along the separator surface, the inlet holes (first holes) 60a formed in the frame 28b in the stacking direction, and the holes (second holes) 90a formed in the metal plate 82a of the first separator 16 in the stacking direction. Ends of the inlet grooves 68a and ends of the inlet grooves 38a are connected together.

The inlet holes 40a of the frame 28a and the holes 106a are not overlapped with the inlet holes 60a of the frame 28b and the holes 90a as viewed from the stacking direction.

Operation of this fuel cell 10 will be described below.

As shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or the like is supplied to the coolant supply passage 32a.

In each of the cell units 12, as shown in FIGS. 1 and 11, the oxygen-containing gas supplied to the oxygen-containing gas supply passage 30a flows in between the inlet ridges 36a of the first membrane electrode assembly 14, and between the inlet ridges 54a of the second membrane electrode assembly 18 into the inlet grooves 56a.

The oxygen-containing gas flowing between the inlet ridges 36a is supplied through the inlet grooves 37a to the oxygen-containing gas flow field 84 of the second separator 20. Then, the oxygen-containing gas is supplied from the oxygen-containing gas flow field 84 to the cathode 24 of the first membrane electrode assembly 14. Thereafter, the oxygen-containing gas is consumed in the power generation reaction, the remaining oxygen-containing gas flows between the outlet ridges 36b, and then the oxygen-containing gas is discharged into the oxygen-containing gas discharge passage 30b.

In the meanwhile, the oxygen-containing gas flowing between the inlet grooves 56a is supplied through the inlet grooves 87a between the second membrane electrode assembly 18 and the first separator 16, and then, the oxygen-containing gas is supplied to the oxygen-containing gas flow field 84 of the first separator 16. The oxygen-containing gas from the oxygen-containing gas flow field 84 is supplied to the cathode 24 of the second membrane electrode assembly 18. Thereafter the oxygen-containing gas is consumed in the power generation reaction, the remaining oxygen-containing gas flows from the outlet grooves 87b, 56b and between the outlet ridges 54b, and then the oxygen-containing gas is discharged into the oxygen-containing gas discharge passage 30b.

Further, as shown in FIGS. 1 and 12, the fuel gas supplied to the fuel gas supply passage 34a flows into the inlet grooves 62a of the second membrane electrode assembly 18. The fuel gas from the inlet grooves 62a moves toward the anode 26 through the inlet holes 64*a*, and then, part of the fuel gas is supplied from the inlet grooves 72*a* to the fuel gas flow field 86 of the second separator 20.

The remaining part of the fuel gas flows through the inlet holes 66*a* and the holes 92*a* of the first separator 16, and then flows between the first separator 16 and the first membrane electrode assembly 14. Thereafter, the fuel gas is supplied to the fuel gas flow field 86 of the first separator 16.

After the fuel gas is consumed in the power generation reaction in the fuel gas flow field 86 of the second separator 20, the consumed fuel gas is discharged into the outlet grooves 72*b*. Then, the fuel gas is discharged from the outlet holes 64*b* through the outlet grooves 62*b* into the fuel gas discharge passage 34*b*. In the meanwhile, after the fuel gas is consumed in the power generation reaction in the fuel gas flow field 86 of the first separator 16, the consumed fuel gas is discharged from the holes 92*b* through the outlet holes 66*b* into the outlet grooves 72*b*. Then, likewise, the fuel gas is discharged into the fuel gas discharge passage 34*b*.

Thus, in each of the first membrane electrode assembly 14 and the second membrane electrode assembly 18, the oxygen-containing gas supplied to the cathode 24 and the fuel gas supplied to the anode 26 are consumed in electrochemical reactions at electrode catalyst layers of the cathode 24 and the anode 26 for generating electricity.

Further, as shown FIGS. 1 and 13, part of the coolant supplied to the coolant supply passage 32*a* flows into the inlet grooves 42*a* of the first membrane electrode assembly 14, and then, the coolant is supplied from the inlet grooves 58*a* to the inlet holes 40*a*. The coolant from the inlet holes 40*a* flows through the holes 106*a* of the second separator 20 into the second separator 20.

The coolant flows inside the second separator 20 along the inlet grooves 112*a*, and is supplied to the coolant flow field 88. Then, the coolant flows from the outlet grooves 112*b* through the holes 106*b*, and then is discharged from the second separator 20. Further, the coolant flows from the outlet holes 40*b* to the outlet grooves 58*b*, 42*b*, and then is discharged into the coolant discharge passage 32*b*.

In the meanwhile, as shown in FIGS. 1 and 14, another part of the coolant supplied to the coolant supply passage 32*a* flows into the inlet grooves 68*a* of the second membrane electrode assembly 18, and then, the coolant flows through the inlet grooves 38*a* to the inlet holes 60*a*. The coolant from the inlet holes 60*a* flows through the holes 90*a* of the first separator 16, and then, the coolant flows into the first separator 16.

The coolant flows along the inlet grooves 100*a* in the first separator 16, and then, the coolant is supplied to the coolant flow field 88. Thereafter the coolant flows from the outlet grooves 100*b* through the holes 90*b*, and then, the coolant is discharged from the first separator 16. Further, the coolant from the outlet holes 60*b* flows through the outlet grooves 38*b*, 68*b*, and then is discharged into the coolant discharge passage 32*b*.

Thus, the first membrane electrode assembly 14 and the second membrane electrode assembly 18 are cooled by the coolant flowing through the coolant flow field 88 in the first separator 16 and the coolant flow field 88 in the second separator 20.

In the first embodiment, all of the fluid passages, i.e., the oxygen-containing gas supply passage 30*a*, the coolant supply passage 32*a*, the fuel gas supply passage 34*a*, the oxygen-containing gas discharge passage 30*b*, the coolant discharge passage 32*b*, and the fuel gas discharge passage 34*b* extend through the frame 28*a* of the first membrane electrode assembly 14, and the frame 28*b* of the second membrane electrode assembly 18 in the stacking direction.

In the structure, no fluid passages are required in the first separator 16 and the second separator 20. The outer dimensions of the first separator 16 and the second separator 20 can be determined in such a manner that the outer dimensions of the first separator 16 and the second separator 20 correspond to the power generation area. Thus, reduction in the size and weight of the first separator 16 and the second separator 20 can be achieved easily, and it becomes possible to reduce the production cost of the first separator 16 and the second separator 20.

Accordingly, the first separator 16 and the second separator 20 can be produced efficiently, and it becomes possible to obtain the entire fuel cell 10 economically.

Further, the unit cell (two separators and one MEA) in each cell unit 12 has the outer seal member 48 and the inner seal member 50, and the outer seal member 74 and the inner seal member 76 alternately, as shown in FIG. 2. In effect, the seal members are provided only on one surface. In the structure, the size of the fuel cell 10 in the stacking direction is reduced as a whole suitably, and the size reduction of the fuel cell 10 is achieved.

Further, the first separator 16 includes the two metal plates 82*a*, 82*b* having the same outer shape. The metal plates 82*a*, 82*b* are stacked together. The outer circumferential ends of the metal plates 82*a*, 82*b* are welded or bonded together to form a hermetical internal space between the metal plates 82*a*, 82*b*. Likewise, the second separator 20 includes the two metal plates 102*a*, 102*b* having the same outer shape. The metal plates 102*a*, 102*b* are stacked together. The outer circumferential ends of the metal plates 102*a*, 102*b* are welded or bonded together to form a hermetical internal space between the metal plates 102*a*, 102*b*.

In the first separator 16, no seal is required between the metal plates 82*a*, 82*b*, and in the second separator 20, no seal is required between the metal plates 102*a*, 102*b*. Therefore, in the first embodiment, the production cost of the first separator 16 and the second separator 20 is reduced effectively, and the fuel cell 10 can be produced economically as a whole.

Further, in the first embodiment, as shown in FIG. 11, the oxygen-containing gas connection channel 113*a* and the oxygen-containing gas connection channel 113*b* are formed between the frames 28*a*, 28*b* that are adjacent to each other in the stacking direction. The oxygen-containing gas connection channel 113*a* connects the oxygen-containing gas supply passage 30*a* and the oxygen-containing gas flow field 84 of the first membrane electrode assembly 14, and the oxygen-containing gas connection channel 113*b* connects the oxygen-containing gas supply passage 30*a* and the oxygen-containing gas flow field 84 of the second membrane electrode assembly.

The oxygen-containing gas connection channel 113*a* and the oxygen-containing gas connection channel 113*b* are formed by arranging the outer seal member 48 and the inner seal member 50 of the frame 28*a*, and the outer seal member 74 and the inner seal member 76 of the frame 28*b* at different positions as viewed from the stacking direction.

More specifically, the oxygen-containing gas connection channel 113*b* includes the inlet ridges 54*a* formed on the surface of the frame 28*b* and extending along the separator surface, the inlet grooves 56*a* formed in the frame 28*b*, and the inlet grooves 87*a* formed in the surface of the metal plate 82*a* of the first separator 16. The inlet grooves 87*a* are connected to grooves between the inlet ridges 54*a*, and extend along the separator surface. Ends of the inlet grooves 56a are connected to ends of the inlet grooves 87a. Thus, the structure of the fuel cell 10 is simplified, and it becomes possible to reduce the size of the entire fuel cell 10 in the stacking direction.

Further, in the first embodiment, as shown in FIG. 12, the fuel gas connection channel 114 is formed between the frames 28a, 28b that are adjacent to each other in the stacking direction. The fuel gas connection channel 114 connects the fuel gas supply passage 34a and the fuel gas flow field 86.

The fuel gas connection channels 114 are formed by arranging the outer seal member 48 and the inner seal member 50 of the frame 28a, and the outer seal member 74 and the inner seal member 76 of the frame 28b at different positions as viewed from the stacking direction.

The fuel gas connection channel 114 includes the inlet grooves 62a, 72a formed in the frame 28b of the second membrane electrode assembly 18 and extending along the separator surface, and the holes 92a extending through the outer circumferential end of the first separator 16 in the stacking direction.

More specifically, the frame 28b has the inlet holes 64a and the inlet holes 66a, and the inlet grooves 62a, 72a formed on both surfaces of the frame 28b are connected to each other through the inlet holes 64a. The inlet holes 66a are provided coaxially with the holes 92a in the stacking direction. The inlet grooves 62a, 72a are connected to the fuel gas flow field 86 of the first separator 16 through the inlet holes 66a and the holes 92a. The inlet grooves 72a are directly connected to the fuel gas flow field 86 of the second separator 20.

Thus, the structure of the fuel cell 10 is simplified, and it becomes possible to reduce the size of the fuel cell 10 in the stacking direction as a whole.

Further, in the first embodiment, as shown in FIGS. 13 and 14, the coolant connection channel 116a connecting the coolant supply passage 32a and the coolant flow field 88 of the second separator 20, and the coolant connection channel 116b connecting the coolant supply passage 32a and the coolant flow field 88 of the first separator 16 are formed between the frames 28a, 28b that are adjacent to each other in the stacking direction.

The coolant connection channels 116a, 116b are formed by arranging the outer seal member 48 and the inner seal member 50 of the frame 28a, and the outer seal member 74 and the inner seal member 76 of the frame 28b at different positions as viewed from the stacking direction.

More specifically, as shown in FIG. 13, the coolant connection channel 116a includes the inlet grooves 42a, 58a provided along the separator surface, the inlet holes 40a formed in the frame 28a in the stacking direction, and the holes 106a formed in the metal plate 102a in the stacking direction. Ends of the inlet grooves 42a and ends of the inlet grooves 58a are connected together.

As shown in FIG. 14, the coolant connection channel 116b includes the inlet grooves 68a, 38a provided along the separator surface, the inlet holes 60a formed in the frame 28b in the stacking direction, and the holes 90a formed in the metal plate 82a in the stacking direction. Ends of the inlet grooves 68a and ends of the inlet grooves 38a are connected together.

In this regard, the inlet holes 40a of the frame 28a and the holes 106a are not overlapped with the inlet holes 60a of the frame 28b and the holes 90a in the stacking direction. Thus, the structure of the fuel cell 10 is simplified, and it becomes possible to reduce the size of the fuel cell 10 in the stacking direction as a whole.

In the first embodiment, the channels for oxygen-containing gas may adopt the channel structure for the fuel gas, and the channels for the fuel gas may adopt the channel structure for the oxygen-containing gas. Further, both of the channels for the fuel gas and the channels for the oxygen-containing gas may adopt bridges having the same structure.

Figure 15:
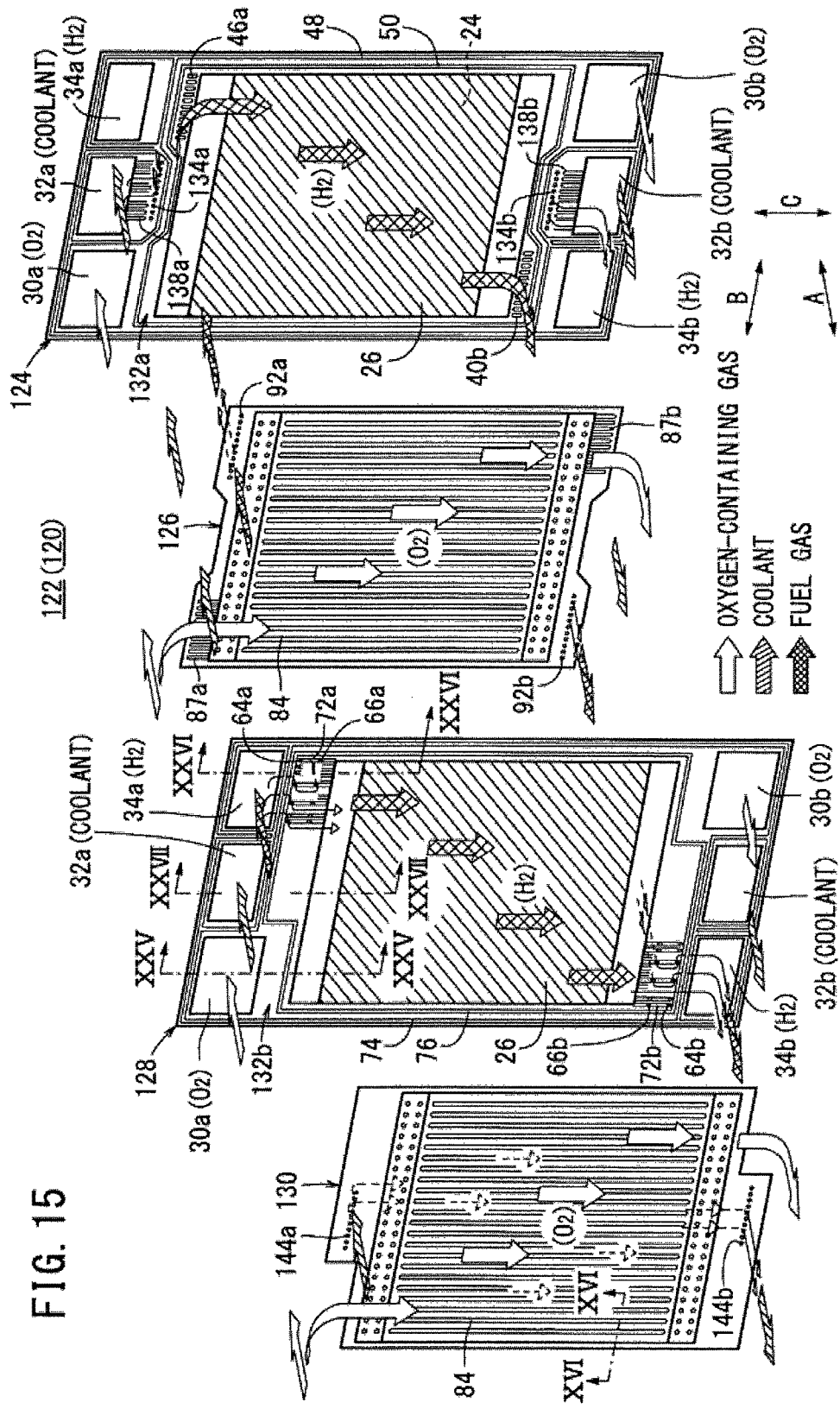
FIG. 15 is an exploded perspective view showing a fuel cell according to a second embodiment of the present invention.

FIG. 15 is an exploded perspective view showing a fuel cell 120 according to a second embodiment of the present invention. The constituent elements of the fuel cell 120 that are identical to those of the fuel cell 10 according to the first embodiment are labeled with the same reference numerals, and description thereof will be omitted. Also in third and fourth embodiments described later, the constituent elements of the fuel cell that are identical to those of the fuel cell 10 according to the first embodiment are labeled with the same reference numerals, and description thereof will be omitted.

Figure 16:
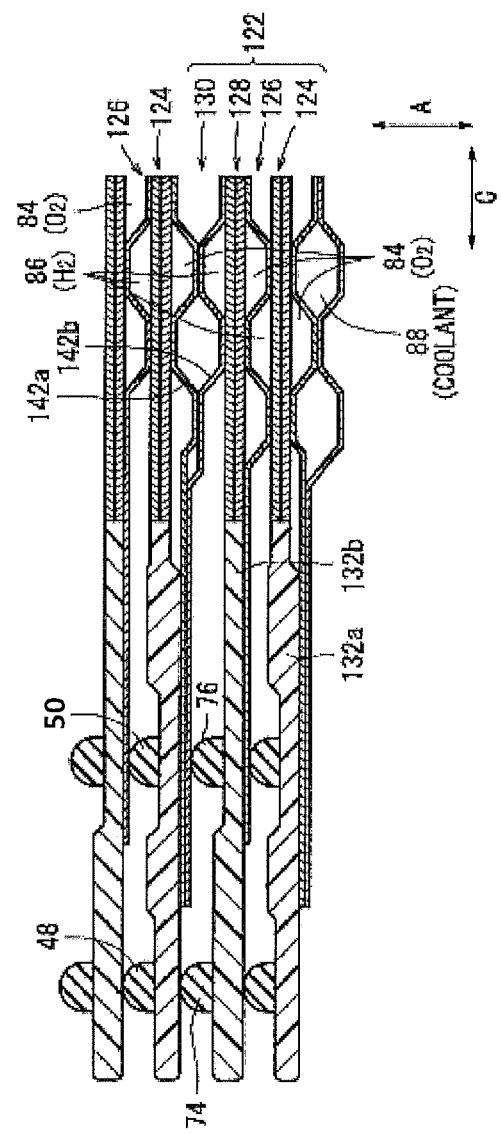
FIG. 16 is a cross sectional view showing the fuel cell, taken along a line XVI-XVI in FIG. 15.

As shown in FIGS. 15 and 16, the fuel cell 120 is formed by stacking a plurality of cell units 122, and each of the cell units 122 includes a first membrane electrode assembly (electrolyte electrode assembly) (MEA) 124, a first separator 126, a second membrane electrode assembly (electrolyte electrode assembly) (MEA) 128, and a second separator 130.

Figure 17:
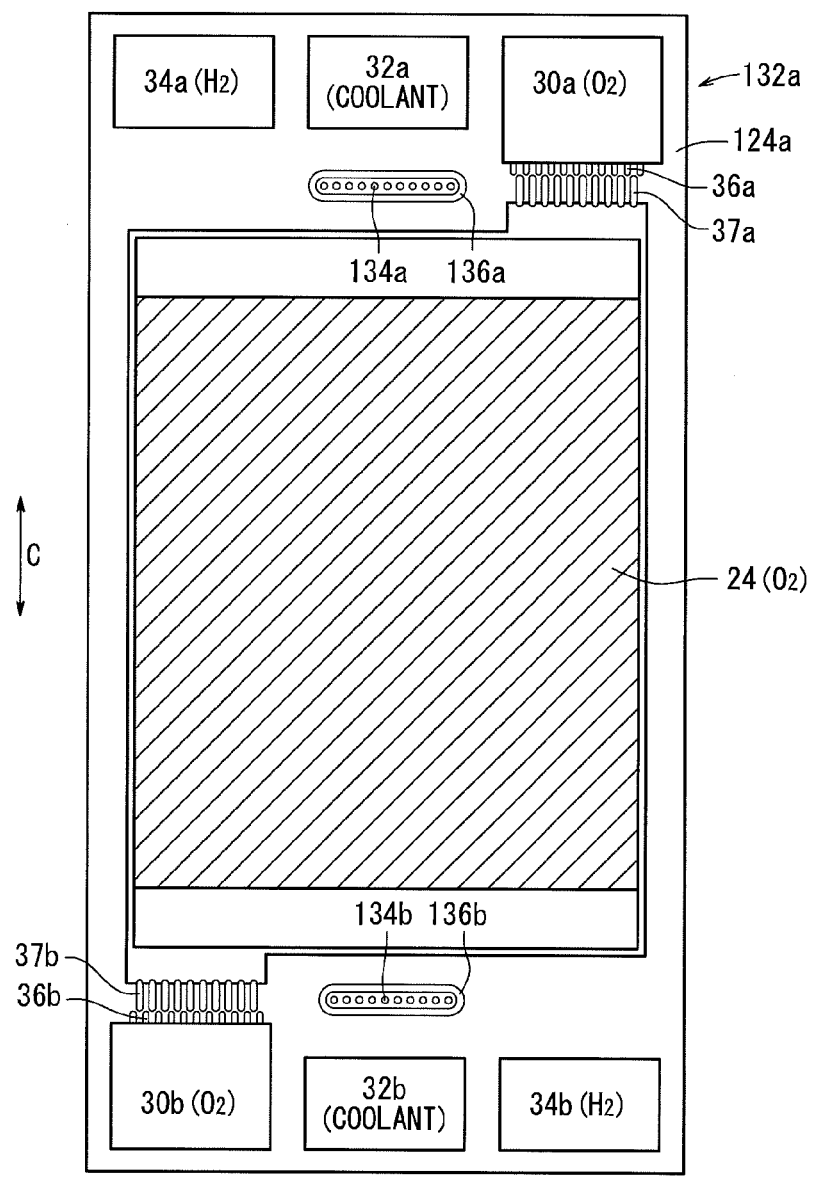
FIG. 17 is a view showing a cathode surface of the first membrane electrode assembly of the fuel cell.

The first membrane electrode assembly 124 and the second membrane electrode assembly 128 include a frame 132a and a frame 132b, respectively. As shown in FIG. 17, at upper positions of the cathode surface 124a of the frame 132a, no inlet grooves 38a are provided adjacent to the lower portion of the coolant supply passage 32a, and a plurality of inlet holes 134a are formed along the width direction of the coolant supply passage 32a. The inlet holes 134a are surrounded by a ring-shaped inlet seal member 136a.

At lower positions of the cathode surface 124a of the frame 132a, no outlet grooves 38b are provided adjacent to the upper portion of the coolant discharge passage 32b, and a plurality of outlet holes 134b are formed along the width direction of the coolant discharge passage 32b. The outlet holes 134b are surrounded by a ring-shaped outlet seal member 136b.

Figure 18:
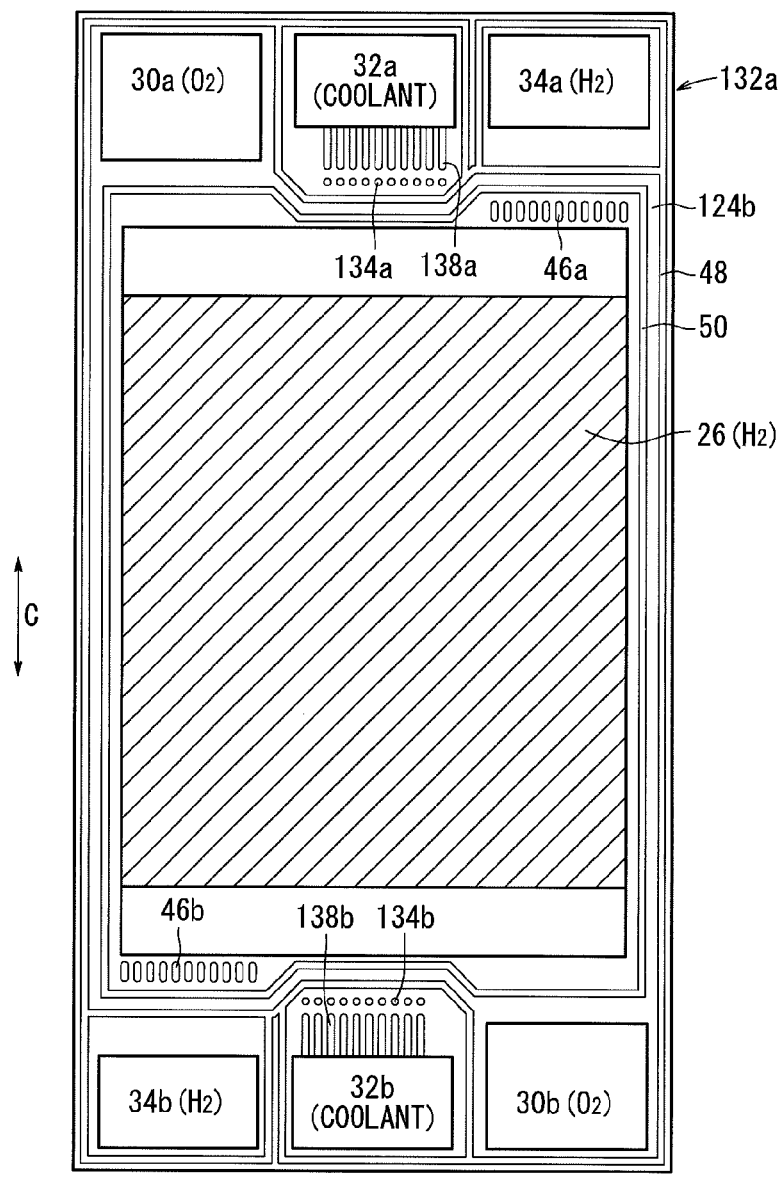
FIG. 18 is a view showing an anode surface of the first membrane electrode assembly.

As shown in FIG. 18, at upper positions of the anode surface 124b of the frame 132a, a plurality of inlet grooves 138a corresponding to the inlet holes 134a are provided, and at lower positions of the anode surface 124b, a plurality of outlet grooves 138b corresponding to the outlet holes 134b are provided.

Figure 19:
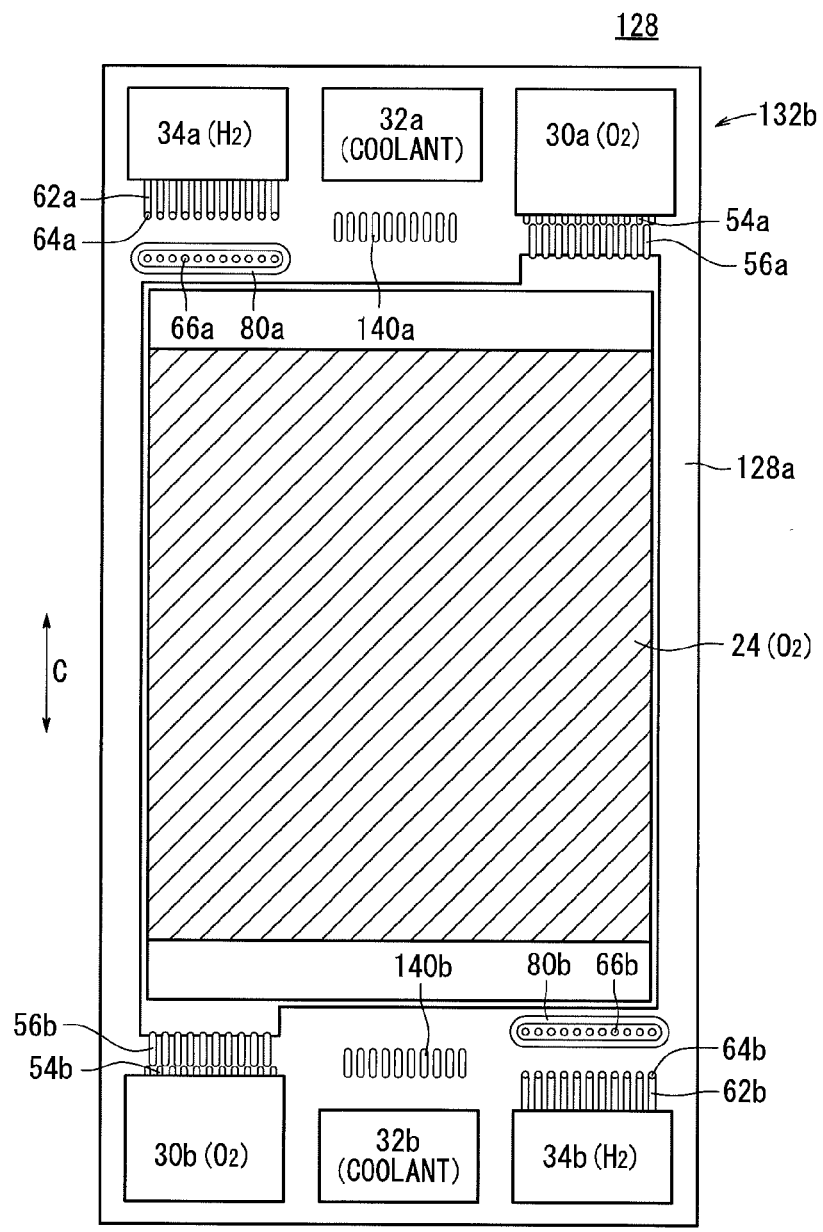
FIG. 19 is a view showing a cathode surface of a second membrane electrode assembly of the fuel cell.

As shown in FIG. 19, at upper positions of the cathode surface 128a of the frame 132b, no inlet holes 60a are provided adjacent to the lower portion of the coolant supply passage 32a, and a plurality of inlet grooves 140a are formed along the width direction of the coolant supply passage 32a.

At lower positions of the cathode surface 128a of the frame 132b, no outlet holes 60b are provided adjacent to the upper portion of the coolant discharge passage 32b, and a plurality of outlet grooves 140b are formed along the width direction of the coolant discharge passage 32b.

Figure 20:
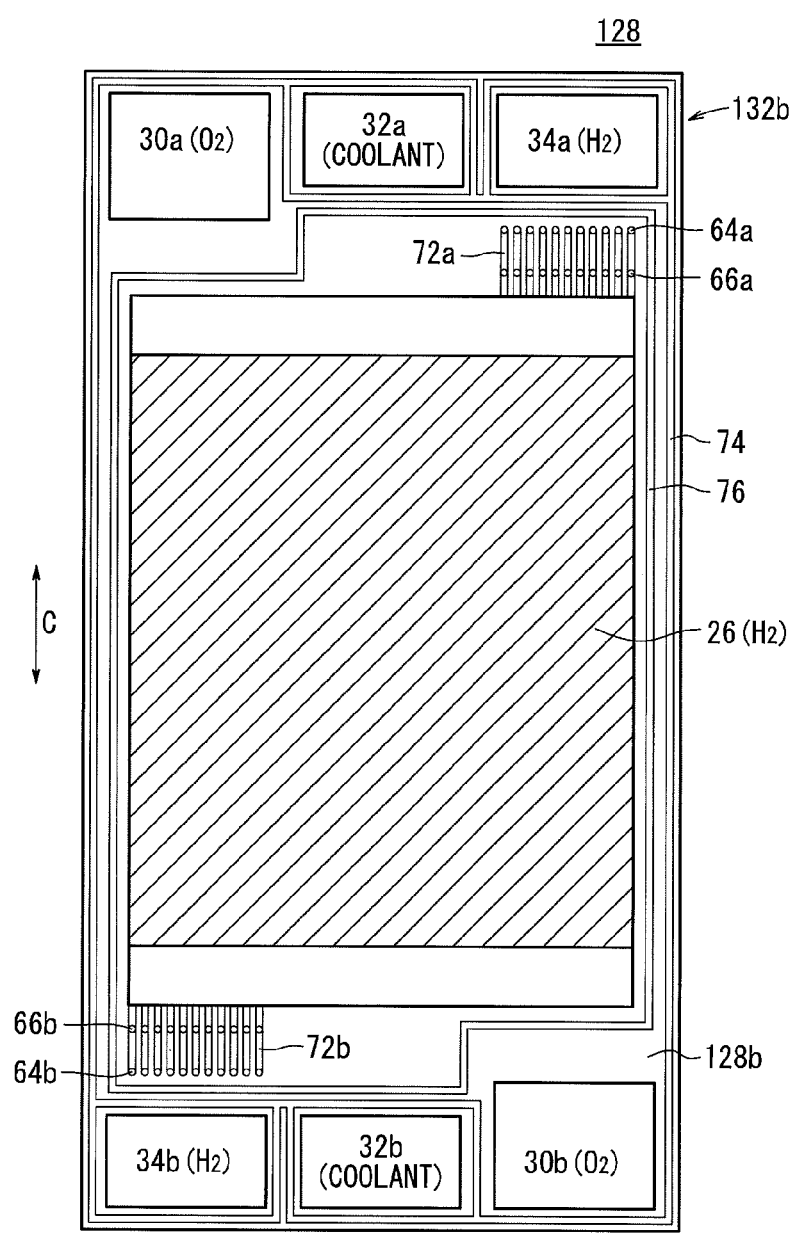
FIG. 20 is a view showing an anode surface of the second membrane electrode assembly.

As shown in FIG. 20, neither the inlet grooves 68a nor the outlet grooves 68b are provided on the anode surface 128b of the frame 132b.

Figure 21:
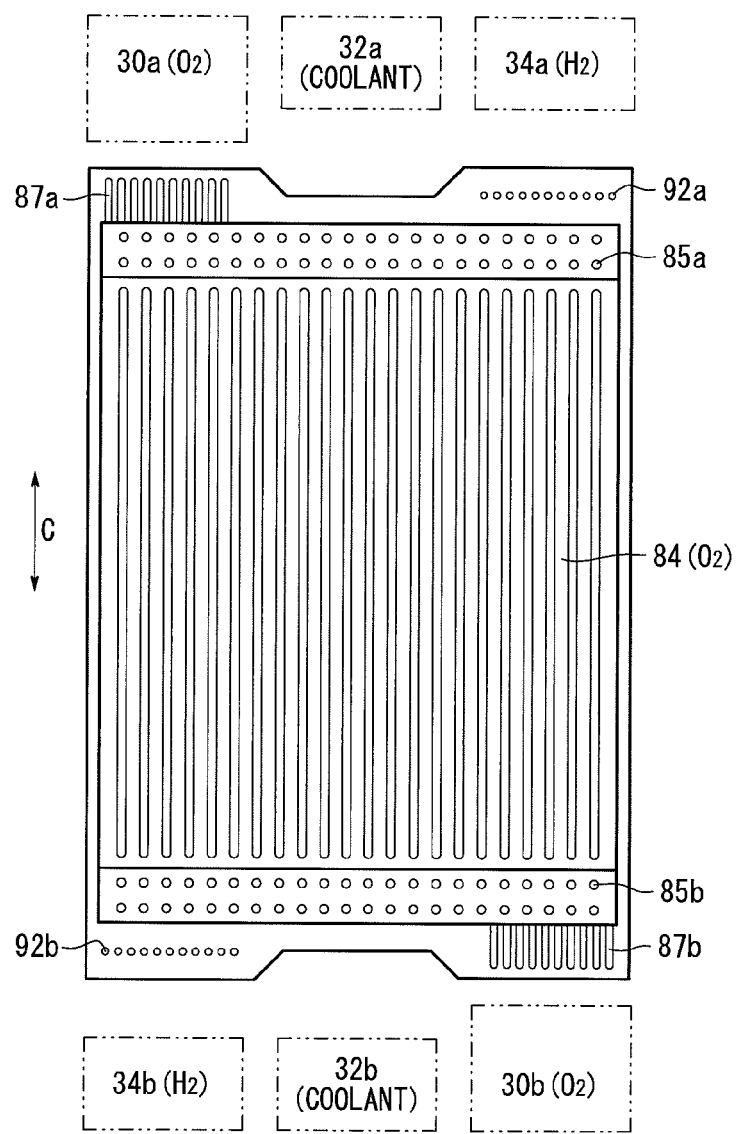
FIG. 21 is a view showing a cathode surface of a first separator of the fuel cell.

The first separator 126 is formed of a single metal plate member. As shown in FIG. 21, a plurality of holes 92 a and a plurality of inlet grooves 87 a are formed above the oxygen-containing gas flow field 84 provided on one surface (e.g., a second surface of the first separator) of the first separator 126, but no holes 90 a are provided. A plurality of holes 92b and a plurality of grooves 87b are formed below the oxygen-containing gas flow field 84, but no holes 90b are provided.

Figure 22:
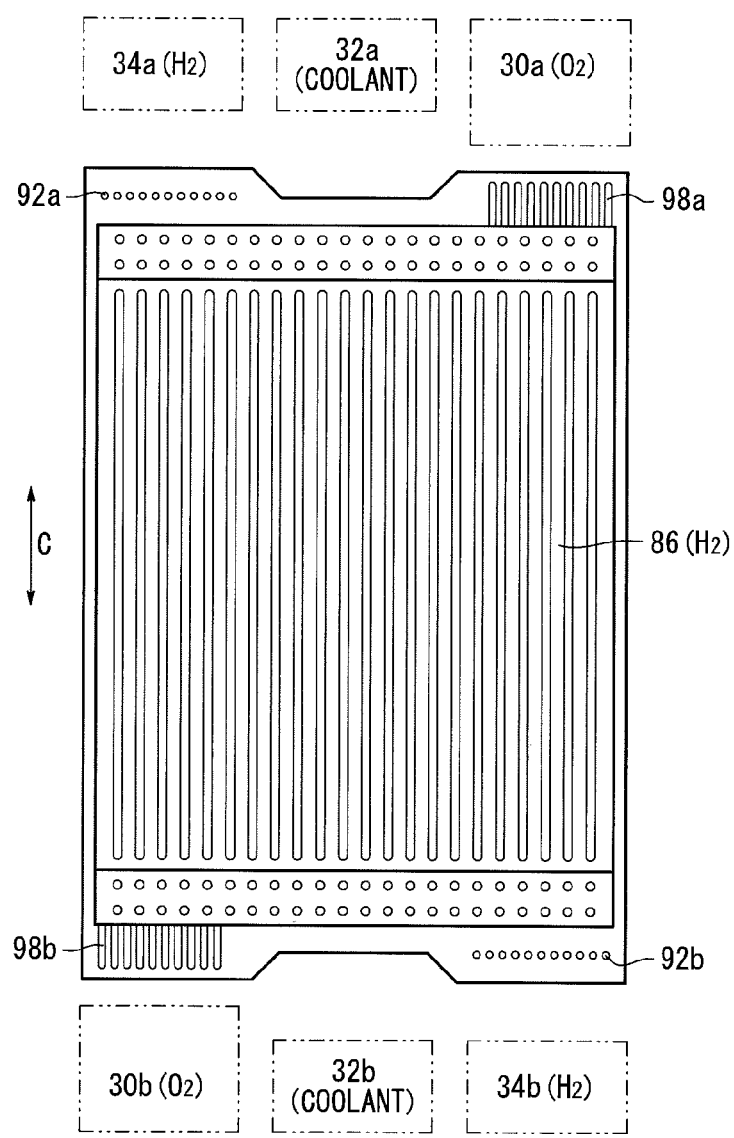
FIG. 22 is a view showing an anode surface of the first separator.

As shown in FIG. 22, a plurality of inlet grooves 98a are provided above the fuel gas flow field 86 formed on the other surface (e.g., a first surface of the first separator) of the first separator 126, but no inlet grooves 100a are provided. A plurality of outlet grooves 98b are provided below the fuel gas flow field 86, but no outlet grooves 100b are provided.

Figure 23:
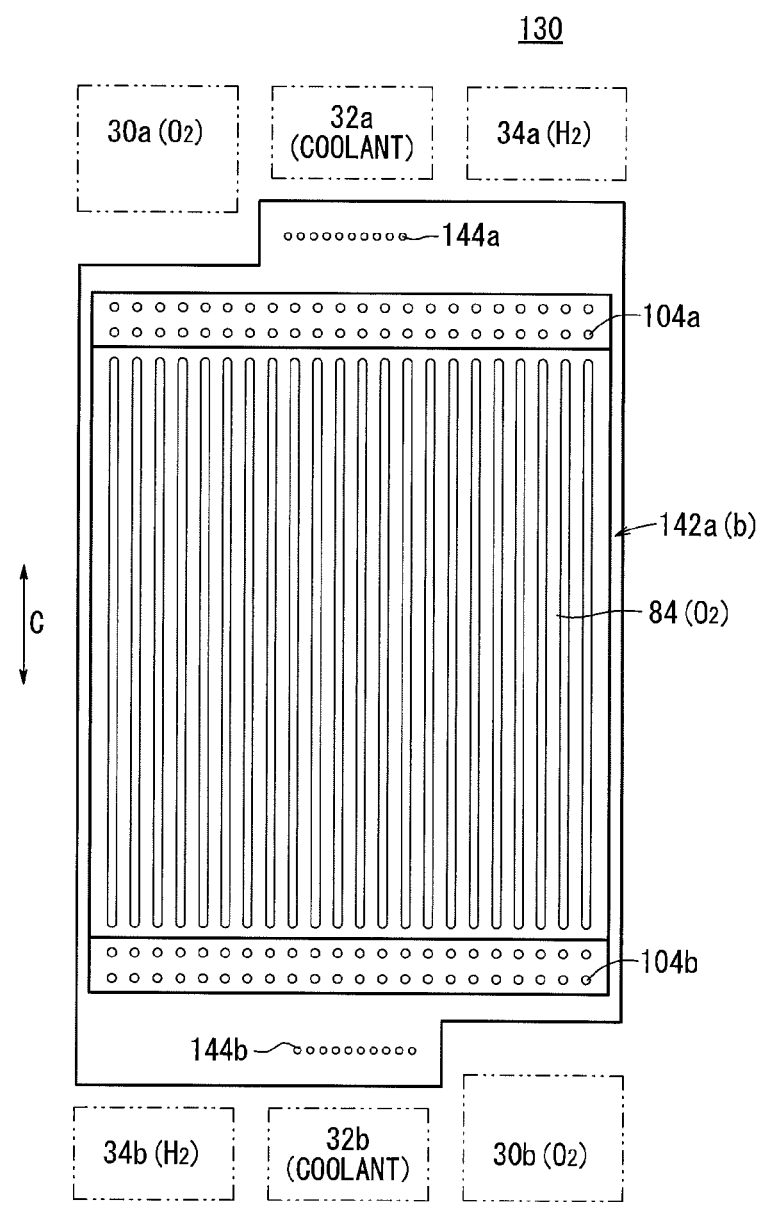
FIG. 23 is a view showing a cathode surface of a second separator of the fuel cell.

As shown in FIG. 23, the second separator 130 includes two metal plates (e.g., stainless plates) 142a, 142b having the same outer shape. The metal plates 142a, 142b are stacked together. The outer circumferential ends of the metal plates 142a, 142b are welded or bonded together, and the internal space between the metal plates 142a, 142b is closed hermetically. The metal plate 142a has an oxygen-containing gas flow field 84 facing the cathode 24, and the metal plate 142b has a fuel gas flow field 86 facing the anode 26. A coolant flow field 88 is formed between the metal plates 142a, 142b.

As shown in FIG. 23, at the upper positions of the metal plate 142a, a plurality of holes 144a are formed below the coolant supply passage 32a, over the width direction of the coolant supply passage 32a. A plurality of holes 144b are formed below the oxygen-containing gas flow field 84 and above the coolant discharge passage 32b, over the width direction of the coolant discharge passage 32b.

Figure 24:
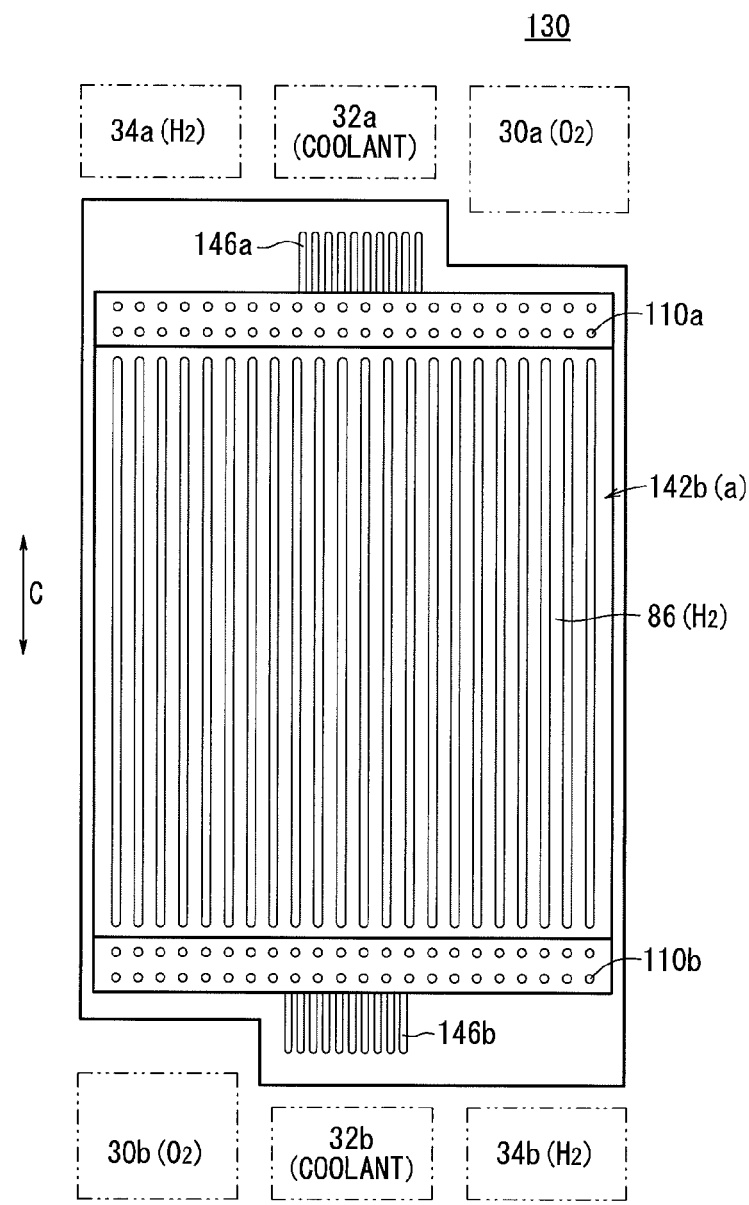
FIG. 24 is a view showing an anode surface of the second separator.

As shown in FIG. 24, at the upper positions of the metal plate 142b, a plurality of inlet grooves 146a are formed below the coolant supply passage 32a, over the width direction of the coolant supply passage 32a. A plurality of outlet grooves 146b are formed below the fuel gas flow field 86 and above the coolant discharge passage 32b, over the width direction of the coolant discharge passage 32b.

Figure 25:
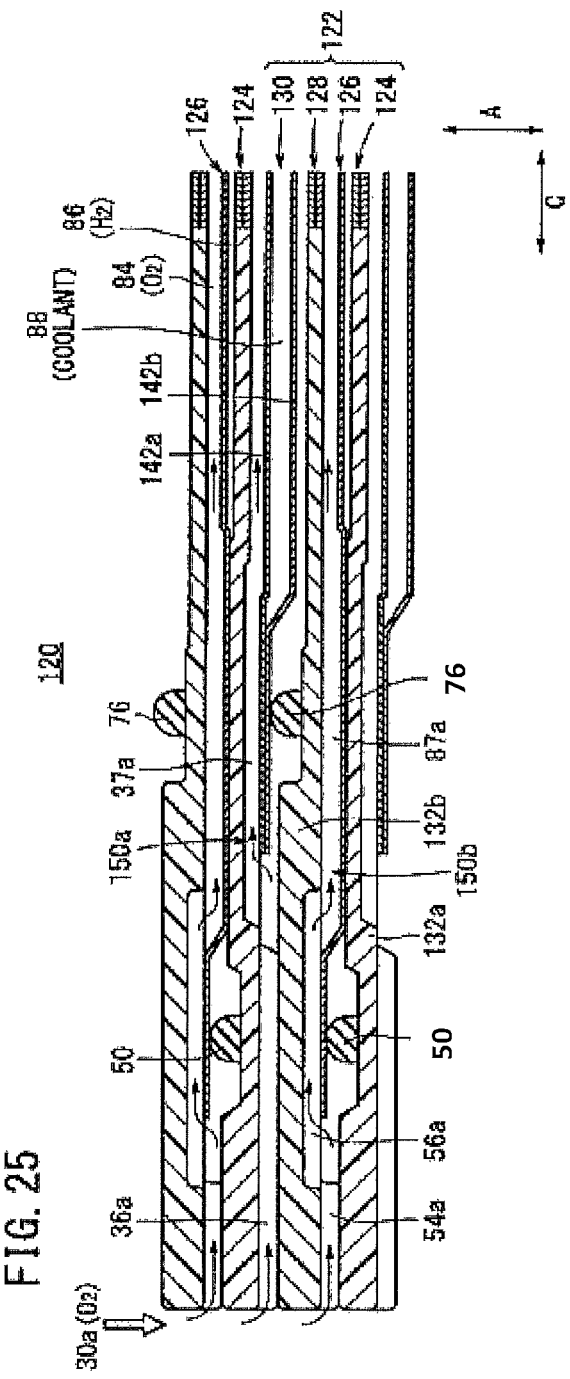
FIG. 25 is a cross sectional view showing the fuel cell, taken along a line XXV-XXV in FIG. 15.

As shown in FIG. 25, an oxygen-containing gas connection channel 150a connecting the oxygen-containing gas supply passage 30a and the oxygen-containing gas flow field 84 of the first membrane electrode assembly 124 and an oxygen-containing gas connection channel 150b connecting the oxygen-containing gas supply passage 30a and the oxygen-containing gas flow field 84 of the second membrane electrode assembly 128 are formed between the frames 132a, 132b that are adjacent to each other in the stacking direction. Though not shown, oxygen-containing gas connection channels connecting the oxygen-containing gas discharge passage 30b and the oxygen-containing gas flow fields 84 are formed between the frames 132a, 132b in the same manner.

The oxygen-containing gas connection channel 150a and the oxygen-containing gas connection channel 150b are formed by arranging the outer seal member 48 and the inner seal member 50 of the frame 132a, and the outer seal member 74 and the inner seal member 76 of the frame 132b at different positions as viewed from the stacking direction.

The oxygen-containing gas connection channel 150b includes inlet ridges (first grooves) 54a formed on the surface of the frame 132b and extending along the separator surface, inlet grooves 56a formed in the surface of the frame 132b, and inlet grooves (second grooves) 87a formed in the surface of the first separator 126. The inlet grooves 87a are connected to the grooves between the inlet ridges 54a, and extend along the separator surface. Ends of the inlet grooves 56a are connected to ends of the inlet grooves 87a.

The oxygen-containing gas connection channel 150a includes inlet ridges 36a formed on the surface of the frame 132a along the separator surface, and inlet grooves 37a.

Figure 26:
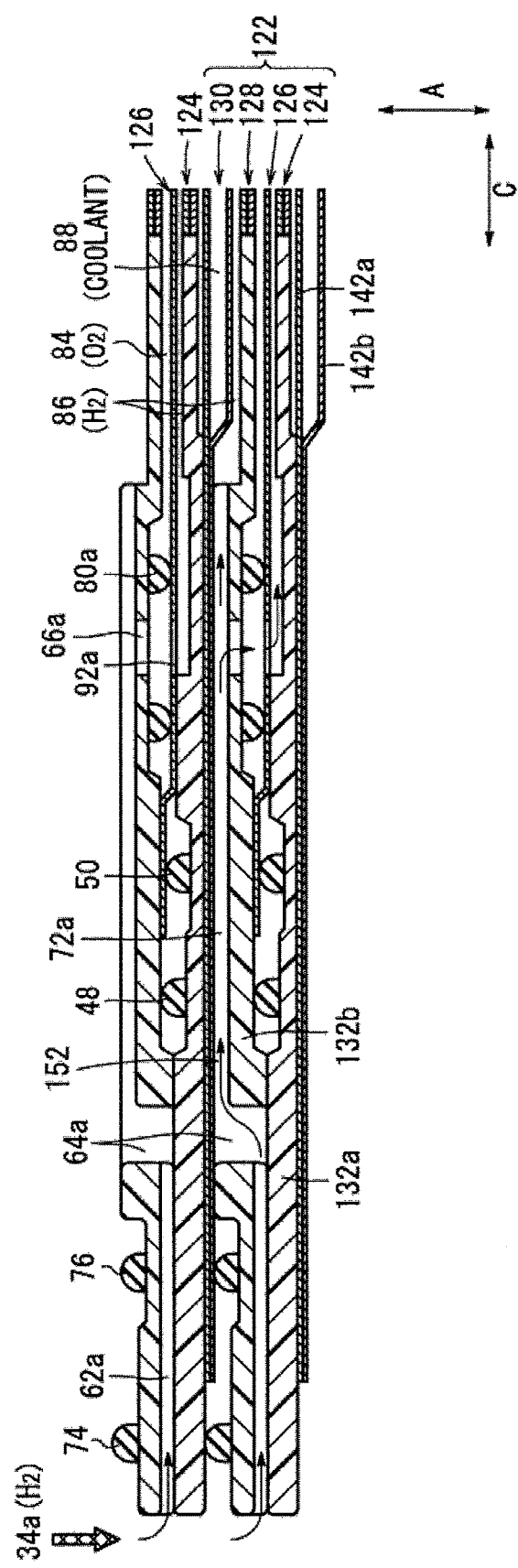
FIG. 26 is a cross sectional view showing the fuel cell, taken along a line XXVI-XXVI in FIG. 15.

As shown in FIG. 26, a fuel gas connection channel 152 connecting the fuel gas supply passage 34a and the fuel gas flow field 86 is formed between the frames 132a, 132b that are adjacent to each other in the stacking direction. Though not shown, fuel gas connection channels connecting the fuel gas discharge passage 34b and the fuel gas flow field 86 are formed between the frames 132a, 132b in the same manner.

The fuel gas connection channel 152 is formed by arranging the outer seal member 48 and the inner seal member 50 of the frame 132a, and the outer seal member 74 and the inner seal member 76 of the frame 132b at different positions as viewed from the stacking direction.

The fuel gas connection channel 152 includes the inlet grooves 62a, 72a formed in the frame 132b of the second membrane electrode assembly 128 and extending along the separator surface, and the holes 92a extending through the outer circumferential end of the first separator 126 in the stacking direction. It should be noted that the inlet grooves 62a may be provided in the frame 132a of the first membrane electrode assembly 124.

More specifically, the frame 132b has the inlet holes 64a and the inlet holes 66a, and the inlet grooves 62a, 72a formed on both surfaces of the frame 132b are connected to each other through the inlet holes 64a. The inlet holes 66a are provided coaxially with, or offset from the holes 92a in the stacking direction. The inlet grooves 62a, 72a are connected to the fuel gas flow field 86 of the first separator 16 through the inlet holes 66a and the holes 92a. The inlet grooves 72a are directly connected to the fuel gas flow field 86 of the second separator 130.

Figure 27:
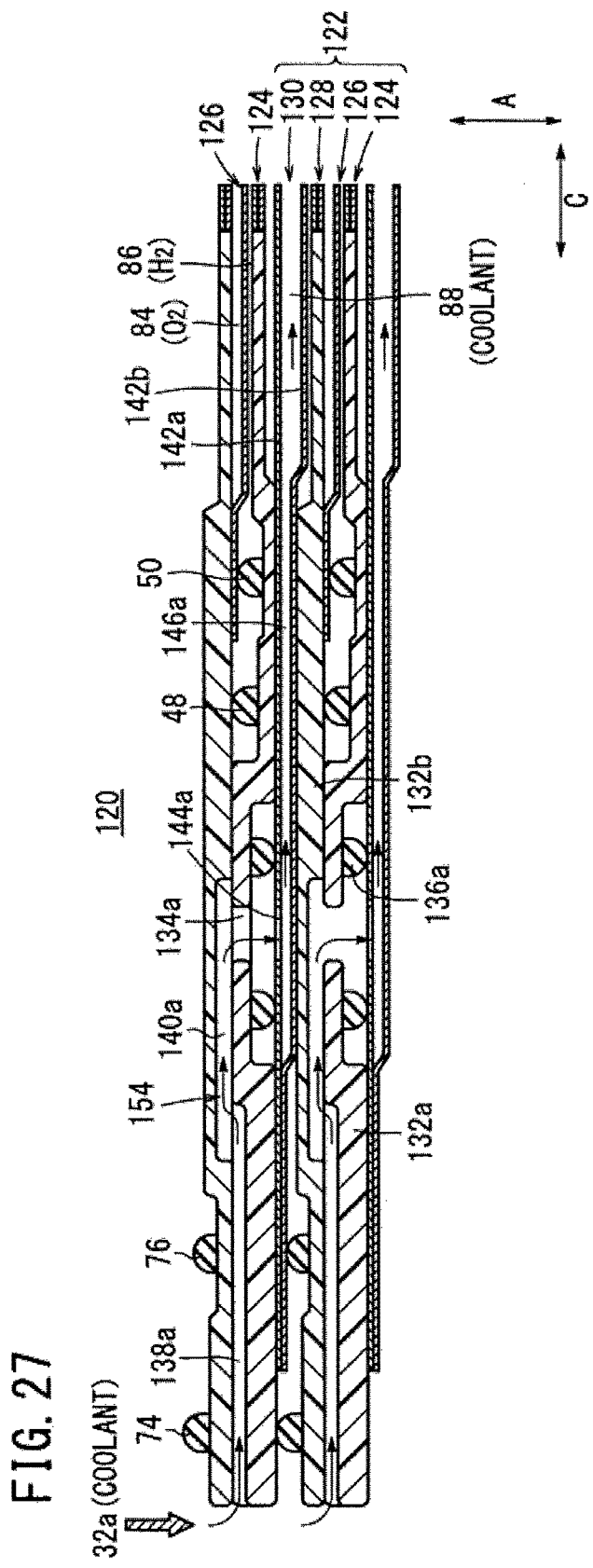
FIG. 27 is a cross sectional view showing the fuel cell, taken along a line XXVII-XXVII in FIG. 15.

As shown in FIG. 27, a coolant connection channel 154 connecting the coolant supply passage 32a and the coolant flow field 88 of the second separator 130 is formed between the frames 132a, 132b that are adjacent to each other in the stacking direction. Though not shown, a coolant connection channel connecting the coolant discharge passage 32b and the coolant flow field 88 is formed between the frames 132a, 132b in the same manner.

The coolant connection channel 154 is formed by arranging the outer seal member 48 and the inner seal member 50 of the frame 132a and the outer seal member 74 and the inner seal member 76 of the frame 132b at different positions as viewed from the stacking direction.

The coolant connection channel 154 includes the inlet grooves 138a, 140a provided along the separator surface, the inlet holes (first holes) 134a formed in the frame 132a in the stacking direction, and the holes (second holes) 144a formed in the metal plate 142a in the stacking direction.

Ends of the inlet grooves 138a and ends of the inlet grooves 140a are connected together.

Operation of the fuel cell 120 will be described briefly below.

In each of the cell units 122, as shown in FIGS. 15 and 25, the oxygen-containing gas supplied to the oxygen-containing gas supply passage 30a flows in between the inlet ridges 36a of the first membrane electrode assembly 124, and between the inlet ridges 54a of the second membrane electrode assembly 128 into the inlet grooves 56a.

The oxygen-containing gas flowing between the inlet ridges 36a is supplied through the inlet grooves 37a to the oxygen-containing gas flow field 84 of the second separator 130. Then, the oxygen-containing gas is supplied from the oxygen-containing gas flow field 84 to the cathode 24 of the first membrane electrode assembly 124. The remaining oxygen-containing gas after consumption in the power generation reaction flows between the outlet ridges 36b, and then is discharged into the oxygen-containing gas discharge passage 30b.

The oxygen-containing gas supplied to the inlet grooves 56a flows through the inlet grooves 87a between the second membrane electrode assembly 128 and the first separator 126, and the oxygen-containing gas is supplied into the oxygen-containing gas flow field 84 of the first separator 126. The oxygen-containing gas is supplied from the oxygen-containing gas flow field 84 to the cathode 24 of the second membrane electrode assembly 128. The remaining oxygen-containing gas after consumption in the power generation reaction flows from the outlet grooves 87b, 56b and between the outlet ridges 54b, and then is discharged into the oxygen-containing gas discharge passage 30b.

Further, as shown in FIGS. 15 and 26, the fuel gas supplied to the fuel gas supply passage 34a flows into the inlet grooves 62a of the second membrane electrode assembly 128. The fuel gas flows from the inlet grooves 62a through the inlet holes 64a toward the anode 26, and some of the fuel gas is supplied from the inlet grooves 72a to the fuel gas flow field 86 of the second separator 130.

The remaining fuel gas flows through the inlet holes 66a and the holes 92a of the first separator 126, and then flows in between the first separator 126 and the first membrane electrode assembly 124. Then, the fuel gas is supplied to the fuel gas flow field 86 of the first separator 126.

The fuel gas that has been consumed in the power generation reaction in the fuel gas flow field 86 of the second separator 130 is discharged into the outlet grooves 72b. Then, the fuel gas flows from the outlet holes 64b, and is discharged through the outlet grooves 62b into the fuel gas discharge passage 34b. In the meanwhile, the fuel gas that has been consumed in the power generation reaction in the fuel gas flow field 86 of the first separator 126 flows from the holes 92b, and then is discharged through the outlet holes 66b into the outlet grooves 72b. Likewise, the fuel gas is discharged into the fuel gas discharge passage 34b.

Thus, in the first membrane electrode assembly 124 and the second membrane electrode assembly 128, the oxygen-containing gas supplied to the cathode 24 and the fuel gas supplied to the anode 26 are consumed in electrochemical reactions at electrode catalyst layers of the cathode 24 and the anode 26 for generating electricity.

Further, as shown in FIGS. 15 and 27, the coolant supplied to the coolant supply passage 32a flows into the inlet grooves 138a of the first membrane electrode assembly 124, and then the coolant is supplied from the inlet grooves 140a to the inlet holes 134a. The coolant from the inlet holes 134a flows through the holes 144a of the second separator 130 into the second separator 130.

The coolant flows inside the second separator 130 along the inlet grooves 146a, and then is supplied to the coolant flow field 88. The coolant flows from the outlet grooves 146b through the holes 144b, and then is discharged from the second separator 130. The coolant flows from the outlet holes 134b through the outlet grooves 140b, 138b, and then is discharged into the coolant discharge passage 32b.

In the structure, the first membrane electrode assembly 124 and the second membrane electrode assembly 128 are cooled by skip cooling by the coolant flowing through the coolant flow field 88 of the second separator 130.

In the second embodiment, the same advantages as in the case of the first embodiment are obtained. For example, reduction in the size and weight of the first separator 126 and the second separator 130 is achieved easily, the production cost is reduced effectively, and it becomes possible to produce the fuel cell 120 economically as a whole.

Figure 28:
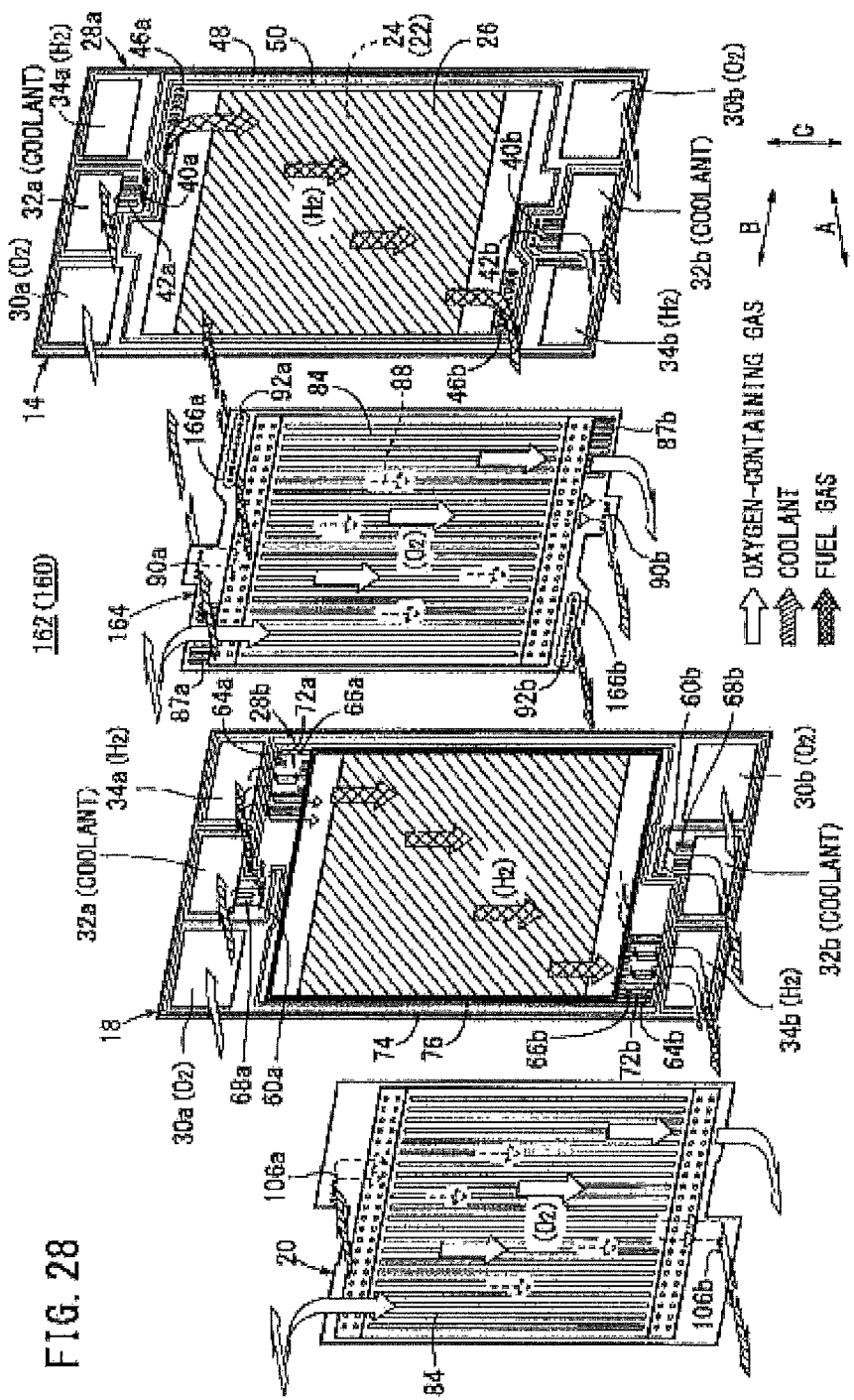
FIG. 28 is an exploded perspective view showing a fuel cell according to a third embodiment of the present invention.

FIG. 28 is an exploded perspective view showing a fuel cell 160 according to a third embodiment of the present invention.

The fuel cell 160 is formed by stacking a plurality of cell units 162 together. Each of the cell units 162 includes a first membrane electrode assembly 14, a first separator 164, a second membrane electrode assembly 18, and a second separator 20. The first separator 164 includes two metal plates 82a, 82b. The outer circumferential ends of the metal plates 82a, 82b are welded or bonded together to form a hermetical internal space between the metal plates 82a, 82b.

Figure 29:
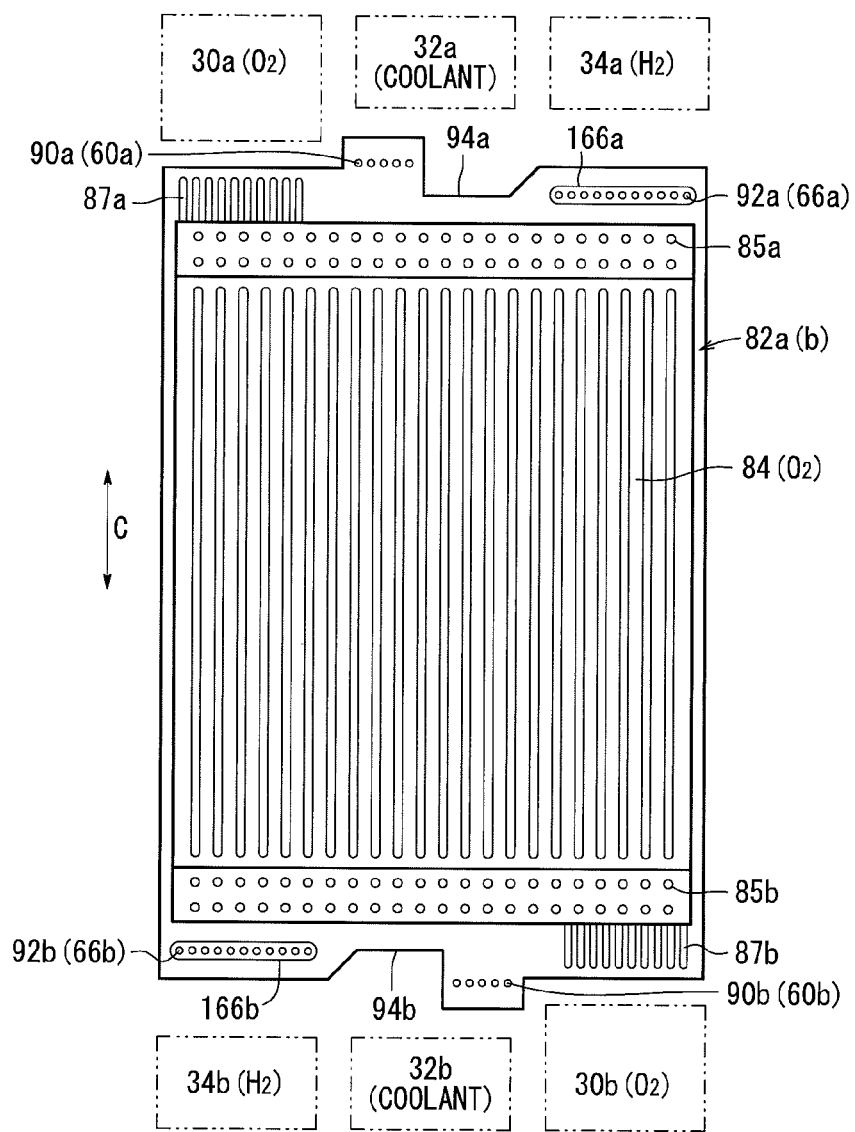
FIG. 29 is a view showing a cathode surface of a first separator of the fuel cell.
Figure 30:
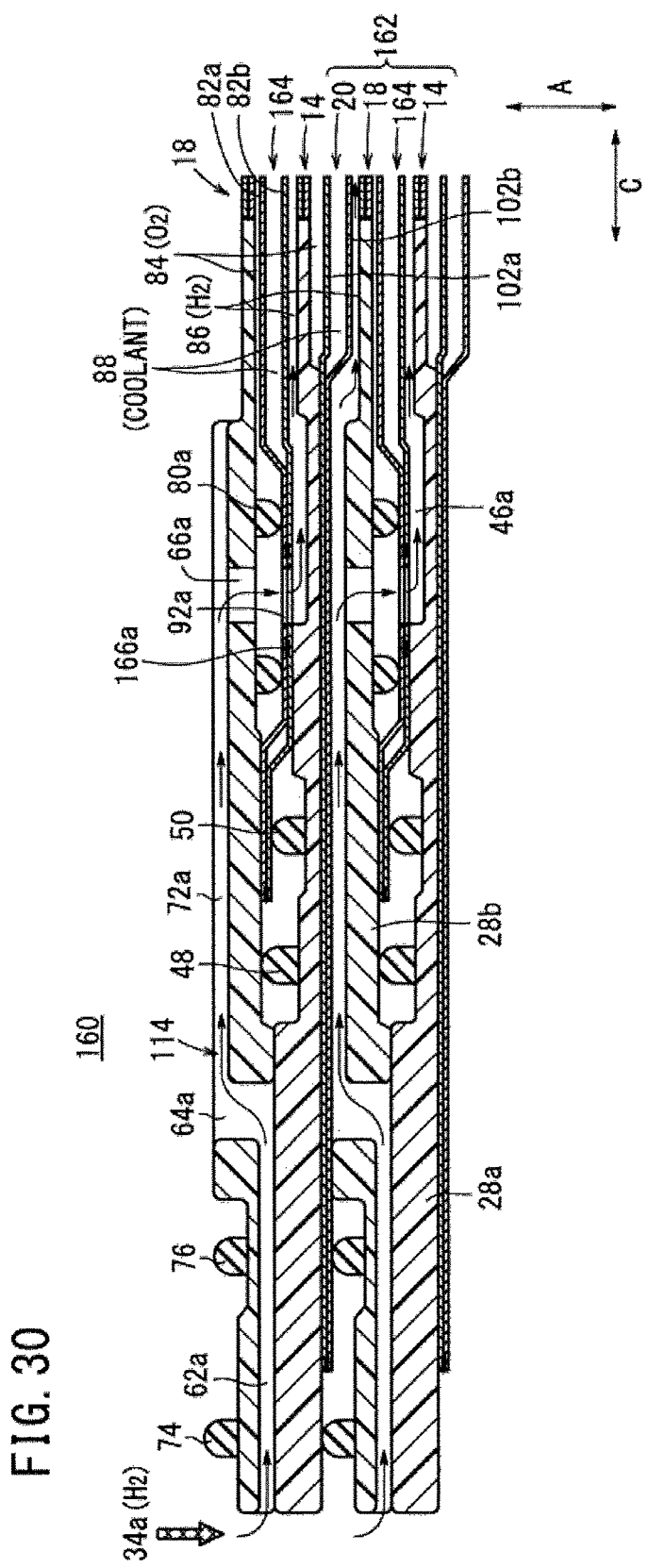
FIG. 30 is a cross sectional view showing the fuel cell.

As shown in FIGS. 29 and 30, a plurality of holes 92a, 92b pass through the metal plates 82a, 82b. The metal plates 82a, 82b are welded or bonded together around the holes 92a, 92b to form joint portions 166a, 166b between the two metal plates 82a, 82b, the joint portions 166a, 166b functioning as seals between the holes 92a, 92b and the internal space (coolant flow field 88).

In the third embodiment, the same advantages as in the cases of the first and second embodiments are obtained. Further, the joint portions 166a, 166b are provided around the holes 92a, 92b as seals. Therefore, entry of the fuel gas from the holes 92a, 92b into the space between the metal plates 82a, 82b (internal space of the first separator 164) is prevented as much as possible.

Figure 31:
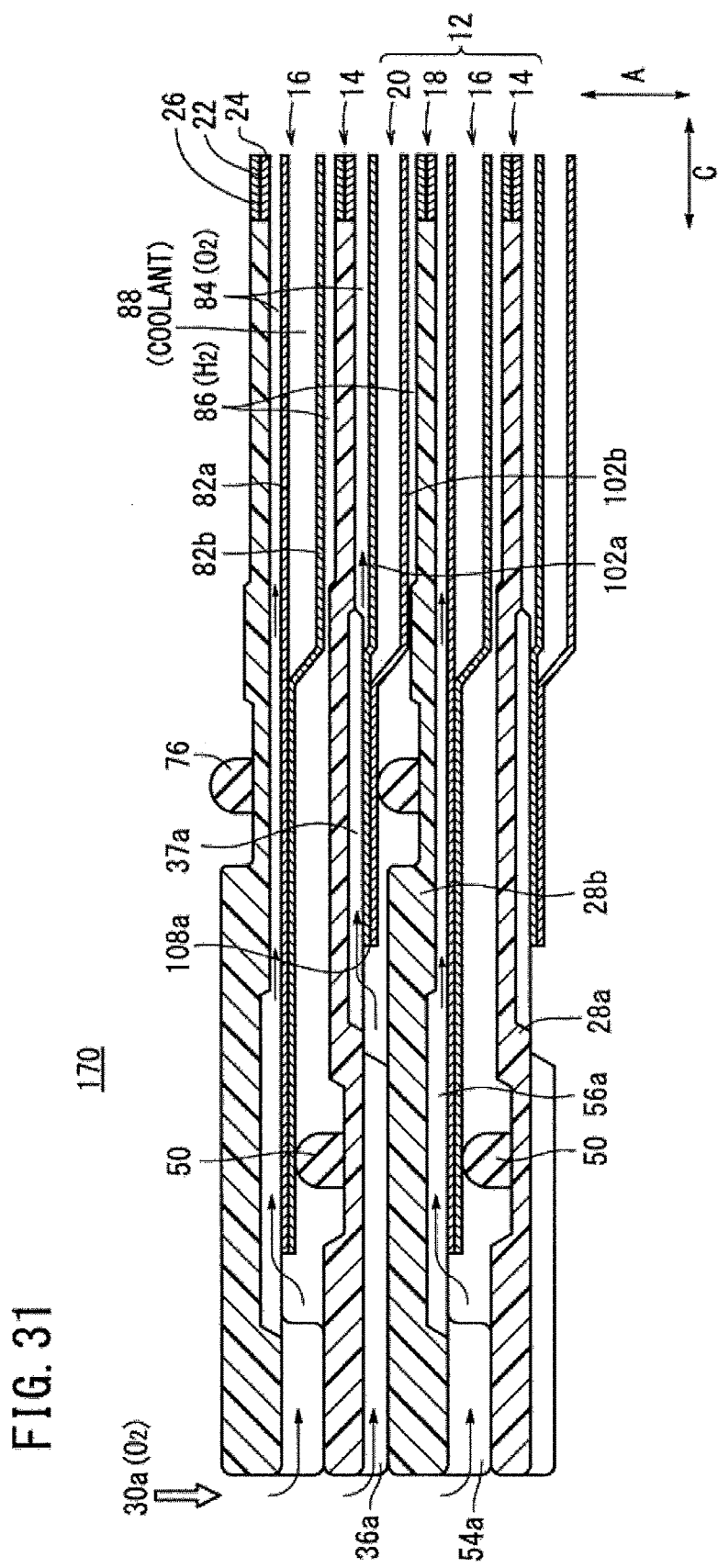
FIG. 31 is a cross sectional view showing a fuel cell according to a fourth embodiment of the present invention.
Figure 32:
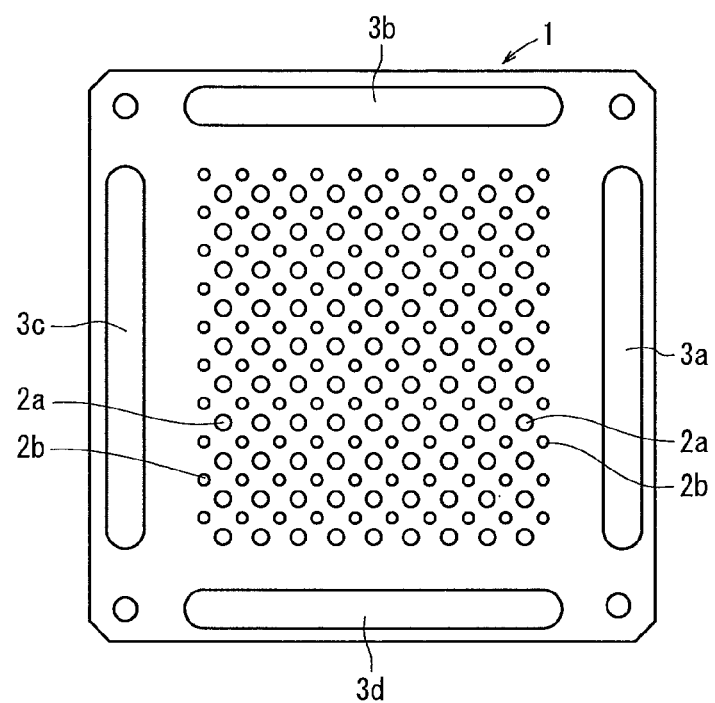
FIG. 32 is a view showing a fuel cell separator disclosed in Japanese Laid-Open Patent Publication No. 08-222237.

FIG. 31 is a cross sectional view showing a fuel cell 170 according to a fourth embodiment of the present invention.

In the fuel cell 170, the first separator 16 does not have any inlet grooves 87a and outlet grooves 87b. Therefore, in particular, the structure of the first separator 16 is simplified economically.

The invention claimed is:

1. A fuel cell including a cell unit formed by sandwiching an electrolyte electrode assembly between a first separator and a second separator, the electrolyte electrode assembly including a pair of electrodes and an electrolyte interposed between the electrodes, a first frame member made of polymer material being provided integrally with an outer circumference of the electrolyte electrode assembly fluid passages including a reactant gas supply passage, a reactant gas discharge passage, a coolant supply passage, and a coolant discharge passage extending through the first frame member in a stacking direction, a seal member for hermetically surrounding the fluid passages and an outer circumference of a reaction surface being provided between the first frame member and a second frame member that are adjacent to each other in the stacking direction, wherein outer circumferential ends of the first separator and the second separator are positioned on an inward side relative to the fluid passages, the first separator has a first reactant gas flow field and a second reactant gas flow field for allowing reactant gases to flow along a surface of the first separator, and the second separator has a different first reactant gas flow field and a different second reactant gas flow field for allowing the reactant gases to flow along a surface of the second separator;

connection channels are formed to connect the reactant gas supply passage and the reactant gas discharge passage to the first reactant gas flow field;

wherein the connection channels include a first set of grooves formed in a surface of the first frame member and extending along the surface of the first separator and a second set of grooves formed in the surface of the second frame member and extending along the surface of the second separator; and wherein at least a part of the connection channels is formed only by the first frame member and the second frame member being adjacent to each other.

2. The fuel cell according to claim 1, wherein the seal member comprises an outer seal line outside the surface of the first separator and an inner seal line within the surface of the first separator; wherein the outer seal line and the inner seal line are provided at different positions as viewed from the stacking direction thereby to form the connection channels.

3. The fuel cell according to claim 1, wherein at least the first separator or the second separator includes two plates having the same outer shape and which are joined together; and a coolant flow field is formed between the two plates.

4. A fuel cell including a cell unit formed by sandwiching an electrolyte electrode assembly between a first separator and a second separator, the electrolyte electrode assembly including a pair of electrodes and an electrolyte interposed between the electrodes;

a first frame member made of polymer material being provided integrally with an outer circumference of the electrolyte electrode assembly, fluid passages including a reactant gas supply passage, a reactant gas discharge passage, a coolant supply passage, and a coolant discharge passage extending through the frame member in a stacking direction, a seal member for hermetically surrounding the fluid passages and an outer circumference of a reaction surface being provided between the first frame member and a second frame member that are adjacent to each other in the stacking direction, wherein outer circumferential ends of the first separator and the second separator are positioned on an inward side relative to the fluid passages, the first separator has a first reactant gas flow field and a second reactant gas flow field for allowing reactant gases to flow along a surface of the first separator, and the second separator has a different first reactant gas flow field and a different second reactant gas flow field for allowing the reactant gases to flow along a surface of the second separator;

connection channels are formed to connect the reactant gas supply passage and the reactant gas discharge passage to the first reactant gas flow field; and the connection channels include:

a first set of grooves formed in the first frame member and extending along the surface of the first separator and a second set of grooves formed in the surface of the second frame member and extending along the surface of the second separator; and holes connected to the first set of grooves and extending through the first separator in the stacking direction, wherein the first set of grooves formed in the first frame member are connected to each other through first through holes; and wherein the first set of grooves are connected via the holes and second through holes to the first reactant gas flow field.

5. The fuel cell according to claim 4, wherein the seal member comprises an outer seal line outside the surface of the first separator and an inner seal line within the surface of the first separator; wherein the outer seal line and the inner seal line are provided at different positions as viewed from the stacking direction thereby to form the connection channels.

6. The fuel cell according to claim 4, wherein the fuel cell unit another electrolyte electrode assembly.

7. The fuel cell according to claim 4, wherein at least the first separator or the second separator includes two plates having the same outer shape and which are joined together; and a coolant flow field is formed between the two plates.

8. The fuel cell according to claim 7, wherein the two plates are joined together around the holes of the connection channels thereby to form a joint portion for sealing the holes from the coolant flow field.

9. A fuel cell including a cell unit formed by sandwiching an electrolyte electrode assembly between a first separator and a second separator, the electrolyte electrode assembly including a pair of electrodes and an electrolyte interposed between the electrodes, a first frame member made of polymer material being provided integrally with an outer circumference of the electrolyte electrode assembly, fluid passages including a reactant gas supply passage, a reactant gas discharge passage, a coolant supply passage, and a coolant discharge passage extending through the first frame member in a stacking direction, wherein outer circumferential ends of the first separator and the second separator are positioned on an inward side relative to the fluid passages, at least the first separator or the second separator includes a first plate and a second plate to form a coolant flow field inside the first separator or the second separator for allowing a coolant to flow parallel a surface of the first separator or the second separator; and a seal member for hermetically surrounding the fluid passages, and wherein the seal member is around an outer circumference of a reaction surface and is provided between the first frame member and a second frame member that are adjacent to each other in the stacking direction, wherein connection channels connecting the coolant supply passage and the coolant discharge passage to the coolant flow field are formed between the first frame member and the second frame member that are adjacent to each other, the channels connecting the coolant supply passage and the coolant discharge passage to the coolant flow field being oriented in a direction perpendicular to the stacking direction, and wherein the connection channels include:

a first set of grooves formed in a surface of the first frame member and extending parallel to the surface of the first separator or the second separator, and a second set of grooves formed in the surface of the second frame member and extending parallel to the surface of the first separator or the second separator, the first set of grooves and the second set of grooves are provided between the first frame member and the second frame member that are adjacent to each other in the stacking direction;

first through holes formed in the first frame member in the stacking direction and connected to the second set of grooves; and second through holes formed in one of the plates adjacent to the first frame member in the stacking direction, connecting the first through holes to the coolant flow field.

10. The fuel cell according to claim 9, wherein the seal member comprises an outer seal line outside the surface of the first separator and an inner seal line within the surface of the first separator;
  wherein the outer seal line and the inner seal line are provided at different positions as viewed from the stacking direction thereby to form the connection channels between the first frame member and the second frame member.

11. The fuel cell according to claim 9, wherein the two plates have the same outer shape.

12. The fuel cell according to claim 9, wherein
  the first set of grooves are provided in the first frame member;
  the second set of grooves are provided in the second frame member that is stacked on the first frame member; and
    wherein ends of the first set of grooves are connected to ends of the second set of grooves.

13. The fuel cell according to claim 9, wherein the seal member is interposed between (i) one of the first frame member and the second frame member and (ii) one of the first plate and the second plate.

14. The fuel cell according to claim 9, wherein the first through holes of the first frame member and first through holes of the second frame member are not overlapped with each other, as viewed from the stacking direction.

15. A fuel cell including a cell unit including a first electrolyte electrode assembly, a second electrolyte electrode assembly, a first separator, and a second separator the first electrolyte electrode assembly and the second electrolyte electrode assembly each include a pair of electrodes and an electrolyte interposed between the electrodes; the second electrolyte electrode assembly being sandwiched between the first separator and the second separator, and the first separator being sandwiched between the first electrolyte electrode assembly and the second electrolyte electrode assembly,
  a first frame member corresponding to the first electrolyte electrode assembly, the first frame member being made of polymer material and provided integrally with an outer circumference of the first electrolyte electrode assembly,
  a second frame member corresponding to the second electrolyte electrode assembly, the second frame member being made of polymer material and provided integrally with an outer circumference of the second electrolyte electrode assembly,
  fluid passages including a reactant gas supply passage, a reactant gas discharge passage, a coolant supply passage, and a coolant discharge passage extending through the first frame member and the second frame member in a stacking direction,
  an inner seal line for hermetically contacting an outer circumferential end surface of one of the first separator and the second separator being provided between the one of the first separator and the second separator and one of the first frame member and the second frame member, and
  an outer seal line for hermetically surrounding the fluid passages and an outer circumference of a reaction surface being provided between the first frame member and the second frame member that are adjacent to each other in the stacking direction,
  wherein at least the first separator or the second separator includes two plates having identical outer perimeters and which are joined together such that the identical outer perimeters are aligned with each other;
  wherein the first separator and the second separator are positioned on an inward side relative to the fluid passages.

16. The fuel cell according to claim 15, wherein a coolant flow field for allowing a coolant to flow along a separator surface is formed between the two plates of the at least the first separator or the second separator.

17. The fuel cell according to claim 15, wherein
  the first separator is formed of a single plate member having a fuel gas flow field on a first surface thereof for allowing a fuel gas as one of reactant gases to flow along the first surface, and an oxygen-containing gas flow field on a second surface thereof for allowing an oxygen-containing gas to flow along the second surface;
  the second separator is formed by joining the two plates together; and
  a coolant flow field is formed between the two plates.

* * * * *